(12) United States Patent
Horiuchi et al.

(10) Patent No.: US 10,129,301 B2
(45) Date of Patent: *Nov. 13, 2018

(54) APPARATUS, SYSTEM, AND METHOD OF CONTROLLING DATA TRANSMISSION, AND RECORDING MEDIUM

(71) Applicant: RICOH COMPANY, LTD., Tokyo (JP)

(72) Inventors: Takeshi Horiuchi, Tokyo (JP); Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/692,558

(22) Filed: Aug. 31, 2017

(65) Prior Publication Data
US 2017/0366585 A1 Dec. 21, 2017

Related U.S. Application Data

(63) Continuation of application No. 14/753,903, filed on Jun. 29, 2015, now Pat. No. 9,787,729.

(30) Foreign Application Priority Data

Jun. 30, 2014 (JP) ................................. 2014-133911

(51) Int. Cl.
*H04L 29/06* (2006.01)
*H04M 3/56* (2006.01)
(Continued)

(52) U.S. Cl.
CPC ...... *H04L 65/1069* (2013.01); *H04L 12/1822* (2013.01); *H04L 65/602* (2013.01);
(Continued)

(58) Field of Classification Search
None
See application file for complete search history.

(56) References Cited

U.S. PATENT DOCUMENTS 7,720,924 B2 * 5/2010 Swinton ............... G06Q 10/107
358/402
9,787,729 B2 * 10/2017 Horiuchi ............. H04L 65/1069
(Continued)

FOREIGN PATENT DOCUMENTS

EP 2963902 A1 * 1/2016 ........... H04L 67/322
JP 2008-227577 9/2008
(Continued)

OTHER PUBLICATIONS

Extended European Search Report dated Dec. 8, 2015 in Patent Applicaton No. 15174503.1.
(Continued)

*Primary Examiner* — Ayaz R Sheikh
*Assistant Examiner* — Faiyazkhan Ghafoerkhan
(74) *Attorney, Agent, or Firm* — Oblon, McClelland, Maier & Neustadt, L.L.P.

(57) ABSTRACT

A transmission management system, when a request for starting communication with a second transmission terminal is received from a first transmission terminal, obtains first service contents information associated with first service identification information for identifying a service to be provided to the first transmission terminal, and causes a relay device to transmit content data that matches the first service contents information to the second transmission terminal in response to receiving content data at the relay device from first transmission terminal.

18 Claims, 18 Drawing Sheets

(51) Int. Cl.
*H04N 7/15* (2006.01)
*H04L 29/08* (2006.01)
*H04L 12/18* (2006.01)

(52) U.S. Cl.
CPC .......... *H04L 67/146* (2013.01); *H04L 67/322* (2013.01); *H04M 3/56* (2013.01); *H04N 7/15* (2013.01); *H05K 999/99* (2013.01)

(56) References Cited

U.S. PATENT DOCUMENTS

| | | | |
|---|---|---|---|
| 2002/0136162 A1* | 9/2002 | Yoshimura | H04L 29/06 370/229 |
| 2005/0132015 A1* | 6/2005 | Swinton | G06Q 10/107 709/207 |
| 2010/0322259 A1* | 12/2010 | Garg | H04L 65/4015 370/401 |
| 2011/0116419 A1* | 5/2011 | Cholas | H04M 3/533 370/259 |
| 2013/0315144 A1* | 11/2013 | Karaoguz | H04L 29/06027 370/328 |
| 2014/0022333 A1 | 1/2014 | Okita | |
| 2014/0064232 A1* | 3/2014 | Chang | H04W 48/18 370/329 |
| 2014/0226641 A1* | 8/2014 | Kim | H04W 4/005 370/338 |
| 2014/0244460 A1 | 8/2014 | Imai et al. | |
| 2014/0254523 A1* | 9/2014 | Chai | H04W 72/04 370/329 |
| 2015/0033311 A1* | 1/2015 | Seed | H04W 4/70 726/7 |
| 2015/0033312 A1* | 1/2015 | Seed | H04W 4/70 726/7 |
| 2015/0282236 A1* | 10/2015 | Chai | H04W 72/04 370/329 |
| 2015/0381665 A1* | 12/2015 | Horiuchi | H04L 67/322 370/261 |
| 2016/0029429 A1* | 1/2016 | Peng | H04W 36/00 370/329 |
| 2016/0269682 A1* | 9/2016 | Horiuchi | H04N 7/147 |

FOREIGN PATENT DOCUMENTS

| | | |
|---|---|---|
| JP | 2009-176099 | 8/2009 |
| JP | 2009-194661 A | 8/2009 |
| JP | 2011-041153 | 2/2011 |
| JP | 2011-510539 | 3/2011 |
| JP | 2012-217122 A | 11/2012 |
| JP | 2014-060607 | 4/2014 |
| JP | 2014-168123 | 9/2014 |
| JP | 2015-070543 | 4/2015 |
| WO | WO2009/091459 A1 | 7/2009 |
| WO | WO 2012/133863 A1 | 10/2012 |

OTHER PUBLICATIONS

Japanese Office Action dated Apr. 10, 2018 in Japanese Patent Application No. 2014-133911 with English translation, 6 pages.
Japanese Office Action dated Jul. 17, 2018 in Application No. 2014-133911 with English translation, 6 pages.

* cited by examiner

| SERVICE ID | IMAGE QUALITY PARAMETER (ex. FRAME RATE) | SOUND QUALITY PARAMETER (ex. SAMPLING RATE) |
|---|---|---|
| sv901 | 30 | 44.1 |
| sv902 | 20 | 44.1 |
| sv903 | 10 | 44.1 |
| ... | ... | ... |

| | | RELAY DEVICE ID | | | |
|---|---|---|---|---|---|
| | | 111a | 111b | 111c | 111d |
| INDEX | RUNNING COST | 0.8 | 0.7 | 1 | 0.9 |
| | RELIABILITY | 1 | 0.9 | 0.9 | 0.9 |
| | DEVICE SIZE | 0.9 | 0.8 | 1 | 0.6 |
| COEFFICIENT (AVERAGE) | | 0.9 | 0.8 | 0.97 | 0.8 |

FIG. 11

RELAY DEVICE MANAGEMENT TABLE

| RELAY DEVICE ID | OPERATING STATE | DATE/TIME RECEIVED | IP ADDRESS OF RELAY DEVICE | MAXIMUM DATA TRANSFER RATE (Mbps) | COEFFICIENT |
|---|---|---|---|---|---|
| 111a | ONLINE | 2014.4.10.13:00 | 1.2.1.2 | 100 | 0.9 |
| 111b | OFFLINE | 2014.4.10.13:10 | 1.2.2.2 | 1000 | 0.8 |
| 111c | ONLINE | 2014.4.10.13:20 | 1.3.1.2 | 100 | 0.97 |
| 111d | ONLINE | 2014.4.10.13:30 | 1.3.2.2 | 10 | 0.8 |

FIG. 12

AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 13

TERMINAL MANAGEMENT TABLE

| TERMINAL ID | COUNTERPART TERMINAL NAME | OPERATING STATE | DATE/TIME RECEIVED | IP ADDRESS OF TERMINAL |
|---|---|---|---|---|
| 01aa | AA TERMINAL, TOKYO OFFICE, JAPAN | ONLINE (COMMUNICATION OK) | 2014.4.10.13:40 | 1.2.1.3 |
| 01ab | AB TERMINAL, OSAKA OFFICE, JAPAN | OFFLINE | 2014.4.09.12:00 | 1.2.1.4 |
| ... | ... | ... | ... | ... |
| 01ba | BA TERMINAL, BEIJINIG OFFICE, CHINA | ONLINE (COMMUNICATION OK) | 2014.4.10.13:45 | 1.2.2.3 |
| 01bb | BB TERMINAL, SHANGHAI OFFICE, CHINA | ONLINE (INTERRUPTED) | 2014.4.10.13:50 | 1.2.2.4 |
| ... | ... | ... | ... | ... |
| 01ca | CA TERMINAL, WASHINGTON D.C. OFFICE, U.S. | OFFLINE | 2014.4.10.12:45 | 1.3.1.3 |
| 01cb | CB TERMINAL, NEW YORK OFFICE, U.S. | ONLINE (COMMUNICATING) | 2014.4.10.13:55 | 1.3.1.4 |
| ... | ... | ... | ... | ... |
| 01da | DA TERMINAL, BERLIN OFFICE, EUROPE | ONLINE (COMMUNICATING) | 2014.4.08.12:45 | 1.3.2.3 |
| 01db | DB TERMINAL, LONDON OFFICE, EUROPE | ONLINE (COMMUNICATION OK) | 2014.4.10.12:45 | 1.3.2.4 |
| ... | ... | ... | ... | ... |

FIG. 14

CANDIDATE LIST MANAGEMENT TABLE

| TERMINAL ID OF REQUEST SENDER TERMINAL | TERMINAL ID OF COUNTERPART TERMINAL |
|---|---|
| 01aa | 01ab, ···, 01ba, 01bb, ···, 01ca, 01cb, 01da, 01db, ··· |
| 01ab | 01aa, 01ca, 01cb |
| 01ba | 01aa, 01ab, 01ca, 01cb, 01da, 01db |
| ... | ... |
| 01db | 01aa, 01ab, 01ba, ···, 01da, 01ca, 01cb, ···, 01da |

FIG. 15

SESSION MANAGEMENT TABLE

| SELECTION SESSION ID | RELAY DEVICE ID | TERMINAL ID OF REQUEST SENDER TERMINAL | TERMINAL ID OF COUNTERPART TERMINAL | DELAY TIME (ms) | DELAY INFORMATION DATE/TIME RECEIVED |
|---|---|---|---|---|---|
| se1 | 111c | 01aa | 01ba | 200 | 2014.4.10.14:00 |
| se1 | 111c | 01aa | 01db | 100 | 2014.4.10.14:10 |
| se2 | 111a | 01ba | 01ca | 50 | 2014.4.10.14:20 |
| ... | ... | ... | ... | ... | ... |

FIG. 16

| TERMINAL ID | RELAY DEVICE ID | | | |
|---|---|---|---|---|
| | 111a | 111b | 111c | 111d |
| 01aa | 100 | 90 | 70 | 50 |
| 01ab | 100 | 90 | 70 | 50 |
| ... | ... | ... | ... | ... |
| 01ba | 80 | 100 | 70 | 90 |
| ... | ... | ... | ... | ... |
| 01db | 50 | 90 | 80 | 100 |
| ... | ... | ... | ... | ... |

| SERVICE ID | IMAGE QUALITY PARAMETER (ex. FRAME RATE) | SOUND QUALITY PARAMETER (ex. SAMPLING RATE) |
|---|---|---|
| sv901 | 30 | 44.1 |
| sv902 | 20 | 44.1 |
| sv903 | 10 | 44.1 |
| sv904 | 30 | 22.05 |
| sv905 | 20 | 22.05 |
| sv906 | 10 | 22.05 |
| ... | ... | ... |

APPARATUS, SYSTEM, AND METHOD OF CONTROLLING DATA TRANSMISSION, AND RECORDING MEDIUM

CROSS-REFERENCE TO RELATED APPLICATIONS

This application is a continuation of U.S. application Ser. No. 14/753,903, filed Jun. 29, 2015, the entire contents of which are incorporated herein by reference and claims priority pursuant to 35 U.S.C. § 119(a) to Japanese Patent Application No. 2014-133911, filed on Jun. 30, 2014, in the Japan Patent Office, the entire disclosure of which is hereby incorporated by reference herein.

BACKGROUND

Technical Field

The present invention relates to controlling transmission of content data among a plurality of transmission terminals.

Description of the Related Art

An example of a transmission system that transmits or receives content data between a plurality of transmission terminals via a relay device includes a videoconference system that carries out videoconference via a communication network such as the Internet. There is an increasing need for such videoconference systems due to reduction in business trip costs and time in recent years. In such a videoconference system, a plurality of videoconference terminals, which are examples of transmission terminals, is used. A videoconference can be carried out by transmission or reception of image data and, sound data between these videoconference terminals.

In addition, the recent improvement of broadband circumstances contributes to transmission/reception of high-quality image data and high-quality sound data. Accordingly, it becomes easier to detect the circumstances of a communication partner in a videoconference, and hence conversation-based communication becomes more productive.

The same communication terminal (or of the same type) may be used for different applications or purposes. For example, in the case of using a transmission terminal for remote diagnosis system, an image of the affected part of a patient needs to be sent to a remote place. It is thus preferable that image data be of high quality. In contrast, in the case of using a communication terminal for a videoconference system for merely conveying a message, image data may'be of low quality, However, there is, a general tendency that the higher the quality of image data and sound data, the more expensive the usage fee of a transmission system. Therefore, in the case of using the same transmission terminal (or of the same type) for different applications or purposes, if the user is unable to select a communication quality that suits a particular application or purpose, the user may eventually pay a wasteful usage fee.

SUMMARY

Example embodiments of the present invention include a transmission management system that manages a plurality of transmission terminals, which stores in a memory, for each of a plurality of services that can be provided to one or more of the transmission terminals, service identification information for identifying the service, and service contents information describing, contents of the service. The transmission management system receives, from a first transmission terminal, a request for starting communication with a second transmission terminal, the request including first service identification information for identifying a service to be provided to the first transmission terminal. The transmission management system obtains first service contents information associated with the first service identification information from the memory, and transmits the first service contents information to a relay device, so as to cause the relay device to transmit content data that matches the first service contents information to the second transmission terminal in response to receiving content data at the relay device from the first transmission terminal.

Example embodiments of the present invention include a relay device that receives first service contents information that is associated with first service identification information for identifying a service to be provided to a first transmission terminal, the first transmission terminal sending a request for starting communication with a second transmission terminal. The relay device stores in a memory, the first service contents information in association with the first service identification information, and transmits content data that matches the first service contents information to the second transmission terminal, in response to receiving content data front the first transmission terminal.

Example embodiments of the present invention include a transmission system including the above-described management system and the above-described relay device, a method performed by the management system, a method performed by the relay device, a non-transitory recording medium storing a control program of the management system, and a non-transitory recording medium storing a control program of the relay device.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 11 is an illustration of a relay device management table;

FIG. 12 is an illustration of an authentication management table;

FIG. 13 is an illustration of a terminal management table;

FIG. 14 is an illustration of a candidate list management table;

FIG. 15 is an illustration of a session management table;

FIG. 16 is an illustration of a preferential rating management table;

DETAILED DESCRIPTION

Figure 1:
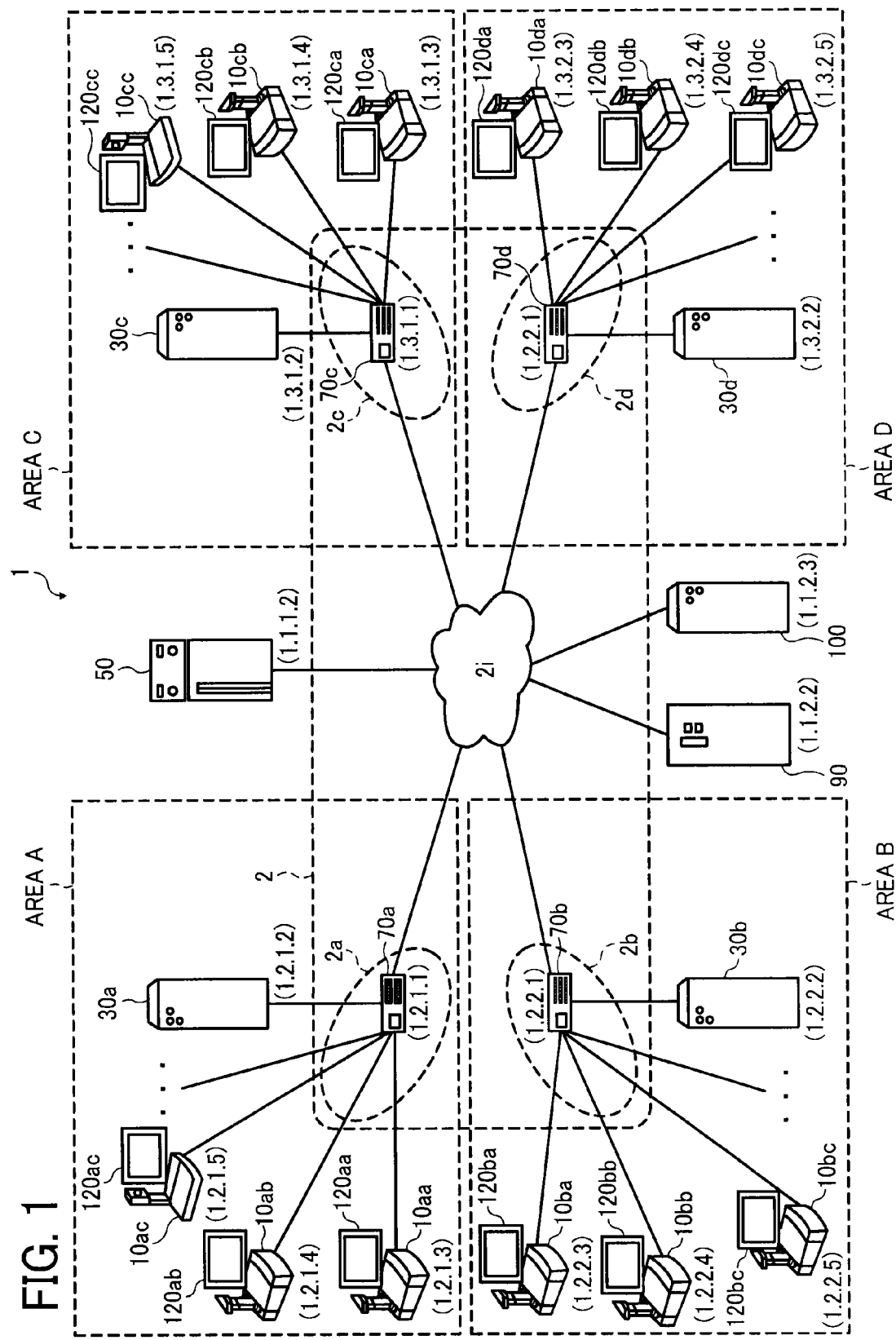
FIG. 1 is a schematic diagram of a transmission system according to an embodiment of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device; that manipulates and transforms data represented as physical, electronic quantities within the computer system's registers and memories into other data similarly represented as physical quantities within the computer system memories or registers or other such information storage, transmission or display devices.

Hereinafter, an embodiment of the present invention will be described using FIGS. 1 to 24.

<Configuration of Transmission System>

Figure 2:
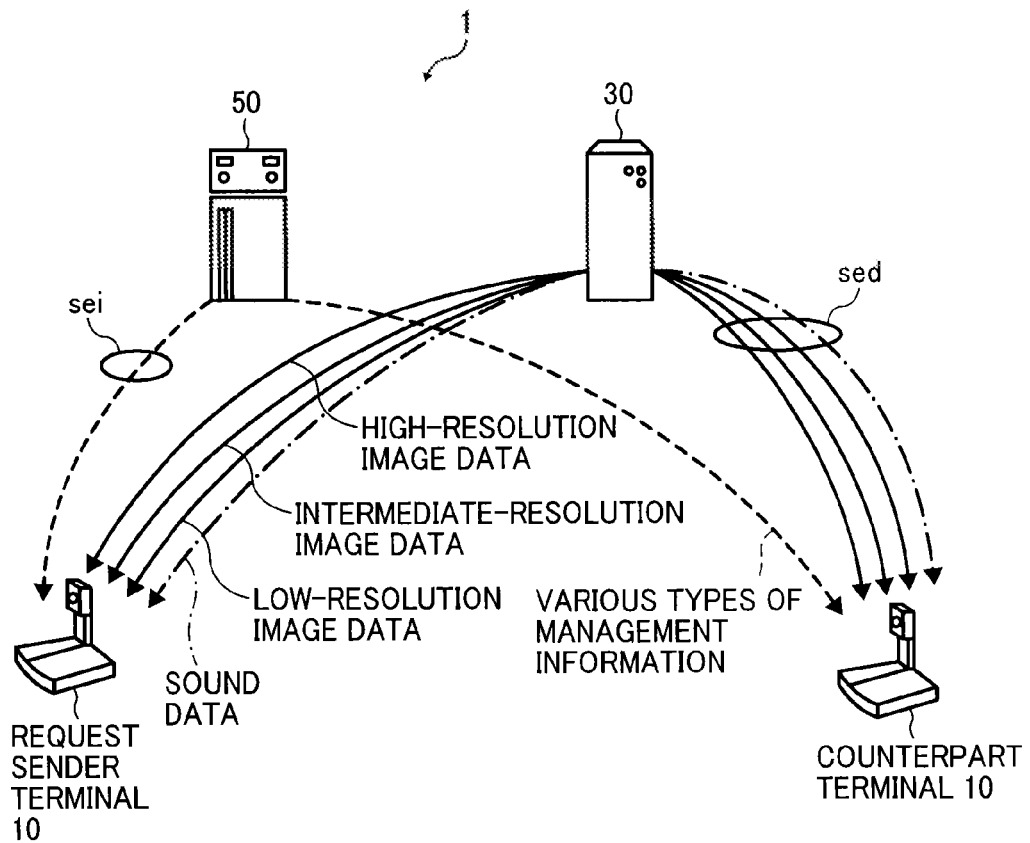
FIG. 2 is an illustration of transmission or reception of image data, sound data, and various types of management information in the transmission system of FIG. 1.
Figure 3A:
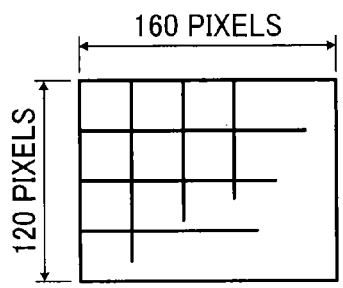
FIGS. 3A to 3C are illustrations describing the image quality of image data.
Figure 3B:
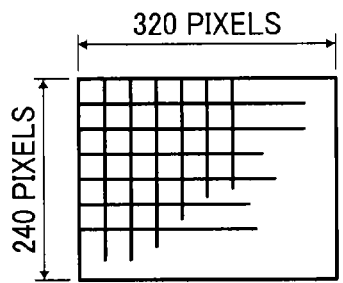
Figure 3C:
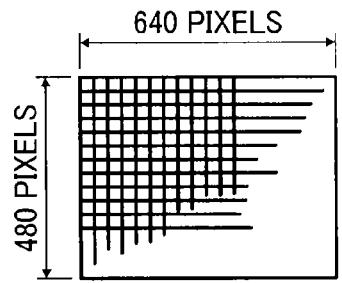

FIG. 1 is a schematic diagram of a transmission system 1 according to the embodiment of the present invention. FIG. 2 is an illustration of a transmission/reception state of image data, sound data, and various types of management information in the transmission system 1. FIGS. 3A to 3C are illustrations describing the image quality of image data.

Examples of the transmission system 1 include a data providing system that performs one-way transmission of content data from one transmission terminal to another transmission terminal via a transmission management system, and a communication system that intercommunicates information, information reflecting feelings, or the like between a plurality of transmission terminals via a transmission management system. The communication system is a system for intercommunicating information, information reflecting feelings, or the like between a plurality of communication terminals (corresponding to "transmission terminals") via a communication management system (corresponding to a "transmission management system"), and examples thereof include a teleconference system and a videoconference system.

In this embodiment, the transmission system, the transmission management system, and the transmission terminal will be described while assuming a videoconference system serving as an example of the communication system, a videoconference management system serving as an example of the communication management system, and a videoconference terminal serving as an example of the communication terminal. That is, the transmission terminal and the transmission management system according to the embodiment of the present invention are applied not only to a videoconference system, but also to a communication system or a transmission system.

First, the transmission system 1 illustrated in FIG. 1 includes a plurality transmission terminals (10aa, 10ab, . . . ), displays (120aa, 120ab, . . . ) for the individual transmission terminals (10aa, 10ab, . . . ), a plurality of relay devices (30a, 30b, 30c, and 30d), a transmission management system 50, a program providing system 90, and a maintenance system 100.

The plurality of terminals 10 transmit or receive image data and sound data serving as examples of content data.

In the following description, the term "transmission terminal" is simply represented as the term "terminal", and the term "transmission management system" is simply represented as the term "management system". In addition, an, arbitrary one or ones of the plurality of terminals (10aa, 10ab, . . . ) is/are represented as a "terminal(s) 10". An arbitrary one or ones of the plurality of displays (120aa, 120ab, . . . ) is/are represented as a "display(s) 120". An arbitrary one or ones of the plurality of relay devices (30a, 30b, 30c, and 30d) is/are represented as a "relay device(s) 30". Further, a terminal serving as a request sender that sends a request to start videoconference is represented as a "request sender terminal", and a terminal serving as a counterpart terminal that is a request destination (relay destination) is represented as a "counterpart terminal".

In addition, as illustrated in FIG. 2, a management information session sea for transmitting and receiving various types of management information is established via the management system 50 between a request sender terminal and a counterpart terminal in the transmission system 1. In addition, four sessions for transmitting and receiving four items of data, namely, high-resolution image data, intermediate-resolution image data, low-resolution image data, and sound data, are established via a relay device 30 between the request sender terminal and the counterpart terminal. Here, these four sessions are collectively indicated as an image/sound data session sed. Note that it is not necessary for the image sound data session sed to include four sessions, and the image/sound data session sed may include less than or more than four sessions.

Here, the resolution of images of image data handled in the embodiment will be described. There are the following images: a low-resolution image, serving as a base image, having horizontal 160 pixels by vertical 120 pixels, as illustrated in FIG. 3A; an intermediate-resolution image having horizontal 320 pixels by vertical 240 pixels, as illustrated in FIG. 3B; and a high-resolution image having horizontal 640 pixels by vertical 480 pixels, as illustrated in FIG. 3C. In the case of a narrowband path, low-quality image data that only includes low-resolution image data serving as a base image is relayed. In the case of a relatively wide band, intermediate-quality image data including low-resolution image data serving as a base image and intermediate-resolution image data is relayed. In addition, in the case of a very wide band, high-quality image data including low-resolution image data serving as a base image, intermediate-resolution image data, and high-resolution image data is relayed.

The relay devices 30 illustrated in FIG. 1 relay content data between the plurality of terminals 10. The management system 50 centrally manages login authentication from the terminals 10, the communication states, candidate lists, and so forth of the terminals 10, and the communication, states and so forth of the relay devices 30. Note that an image of image data may be a moving image or a still image, or may include both thereof.

A plurality of routers (70a, 70b, 70c, and 70d) each select a route that is most suitable for transmitting content data such as image data and sound data. Hereinafter, an arbitrary one or ones of the routers (70a, 70b, 70c, and 70d) is/are represented as a "router(s) 70".

The program providing system 90 includes a hard disk (HD) 204 described later. The HD 204 stores a terminal program for causing a terminal 10 to achieve various functions (or for causing a terminal 10 to function as various elements), and the terminal program can be transmitted to the terminal 10. The HD 204 of the program providing system 90 also stores a relay device program for causing a relay device 30 to achieve various functions (or for causing a relay device 30 to function as various elements), and the relay device program can be transmitted to the relay device 30. The HD 204 of the program providing system 90 further stores a transmission management program for causing the management system 50 to achieve various functions (or for causing the management system 50 to function as various elements), and the transmission management program can be transmitted to the management system 50.

The maintenance system 100 is one or more computers for performing maintenance, management, or conservation of at least one of the terminals 10, the relay devices 30, the management system 50, and the program providing system 90. For example, in the case where the maintenance system 100 is located in one, country, and the terminals 10, the relay devices 30, the management system 50, or the program providing system 90 is/are located outside that country, the maintenance system 100 remotely performs, via a communication network 2, maintenance, management, or conservation of at least one of the terminals 10, the relay devices 30, the management system 50, and the program providing system 90. In addition, the maintenance, system 100 performs maintenance such as management of the modal number, serial number, sales contact, maintenance checkup, or a past history of failures of at least one of the terminals 10, the relay devices 30, the management system 50, and the program providing system 90 without having the communication network 2 therebetween.

The terminals (10aa, 10ab, 10ac, . . . ), the relay device 30a, and the router 70a are connected to be communicable with each other by a local area network (LAN) 2a. The terminals (10ba, 10bb, 10bc, . . . ), the relay device 30b, and the router 70b are connected to be communicable with each other by a LAN 2b. In addition, the LAN 2a and the LAN 2b are connected to be communicable with each other via the Internet 2i and are configured in an area A and an area B, respectively. For example, the area A is Japan, the LAN 2a is configured in an office in Tokyo, the area B is China, and the LAN 2b is configured in an office in China.

The terminals (10ca, 10cb, 10cc, . . . ), the relay device 30c, and the router 70c are connected to be communicable with each other by a LAN 2c. The terminals (10da, 10db, 10dc, . . . ), the relay device 30d, and the router 70d are connected to be communicable with, each other by a LAN 2d. In addition, the LAN 2c and the LAN 2d are connected to be communicable with each other via the Internet 2i and are configured in an area C and an area D, respectively. For example, the area C is the United States (U.S.), the LAN 2c is configured in an office in the U.S., the area D is Europe, and the LAN 2d is configured in an office in Europe. The routers (70a, 70b, 70c, and 70d) are connected to be communicable with one another via the Internet 2i.

In addition, the management system 50 and, the program providing system 90 are connected to be communicable with the terminals 10 and the relay devices 30 via the Internet 2i. The management system 50 and the program providing system 90 may be located in the area A, the area B, the area C, or the area B, or may be located in other areas.

In the embodiment, the communication network 2 of the embodiment includes the LAN 2a, the LAN 2b, the Internet 2i, the LAN 2c, and the LAN 2d. The communication network 2 may include not only a wired portion, but also a portion where communication is performed wirelessly, such as Wireless Fidelity (WiFi) or Bluetooth (registered trademark).

In addition in FIG. 1, four digits indicated below each of the terminals 10, each of the relay devices 30, the management system 50, each of the routers 70, the program providing system 90, and the maintenance system 100 indicates an IP address in an abbreviated form in the general Internet Protocol version 4 (IPv4). For example, the IP address of the terminal 10aa is "1.2.1.3". Although Ipv6 may be used instead of Ipv4, Ipv4 is used in order to make the description simple.

Note that the terminals 10 may be used not only for communication between different offices or for communication between different rooms in the same office, but also for communication within the same room or for outdoor-indoor communication or outdoor-outdoor communication. In the case where the terminals 10 are used outside, wireless communication using a mobile phone communication network or the like is performed.

<Hardware Configuration of Transmission System>

Figure 4:
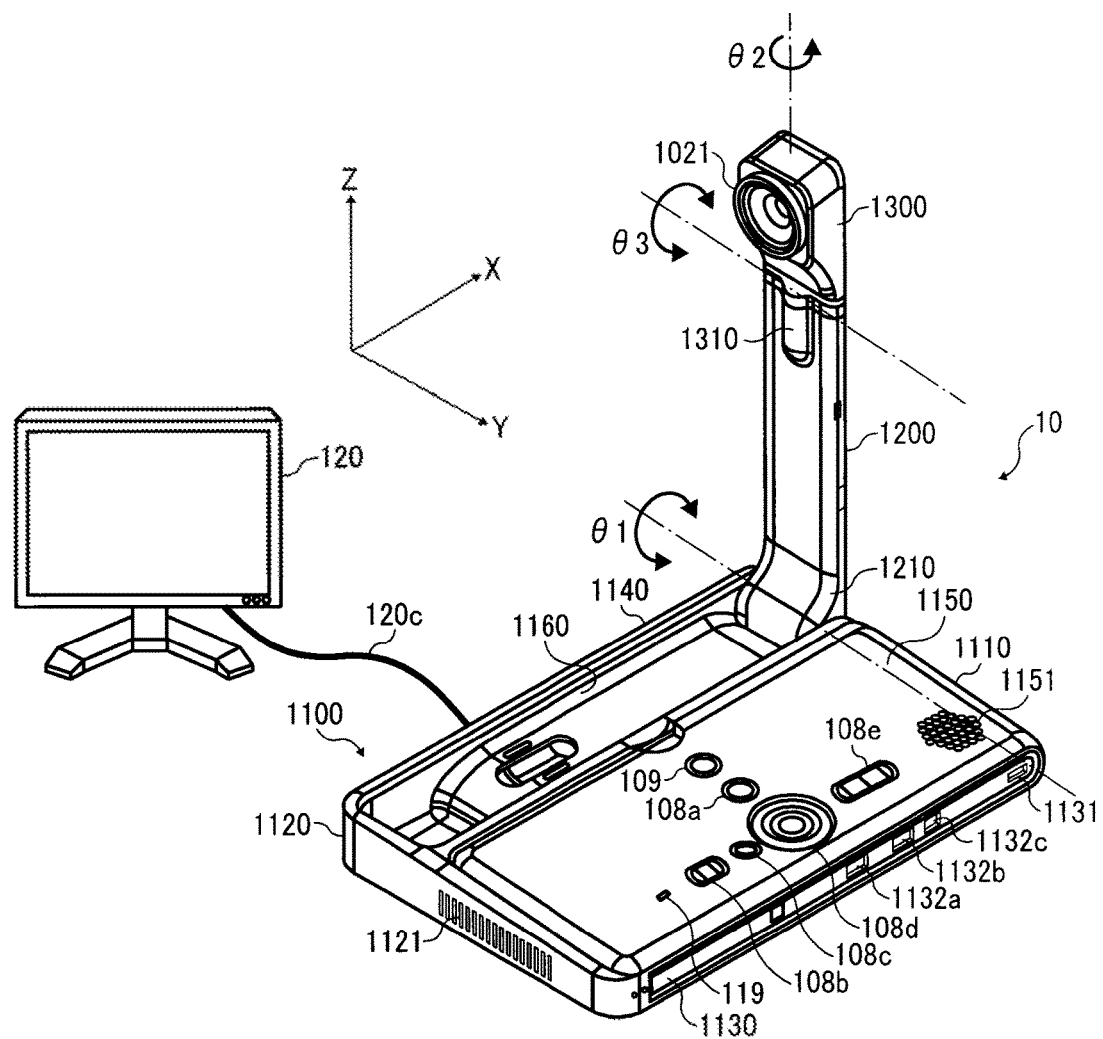
FIG. 4 is an external view of a terminal of the system of FIG. 1 according to the embodiment.

Next, the hardware configuration of the embodiment will be described. FIG. 4 is an external view of a terminal 10 according to the embodiment. As illustrated in FIG. 4, the terminal 10 includes a casing 1100, an arm 1200, and a camera housing 1300. Among these portions, a front wall 1110 of the casing 1100 has an inlet face including a plurality of inlet holes, and a back wall 1120 of the casing 1100 has an exhaust face 1121 on which a plurality of exhaust holes is formed. Accordingly, by driving of a cooling fan included in the casing 1100, air behind the communication terminal 10 can be taken in via the inlet face and exhausted to the rear of the communication terminal 10 via the exhaust face 1121. A right-side wall 1130 of the casing 1100 has a sound pickup hole 1131 formed thereon, and a built-in microphone 114, described later, is capable of picking up sound such as sound, noise, or vibration.

An operation panel 1150 is formed toward the right-side wall 1130 of the casing 1100. The operation panel 1150 has a plurality of operation keys (108a to 108e) described later, a power switch 109 described later, and an alarm lamp 119 described later, which are formed thereon. In addition, the operation panel 1150 has a sound output face 1151 formed thereon, which is formed of a plurality of sound output holes for allowing output sound from a built-in speaker 115 described later to pass through. In addition, an accommodation portion 1160 serving as a recess for accommodating the arm 1200 and the camera housing 1300 is formed toward a left-side wall 1140 of the casing 1100. A plurality of connection ports (1132a to 1132c) for electrically connecting cables to an external device connection interface (I/F) 118 described later is provided on the right-side wall 1130 of the casing 1100. In contrast, a connection port for electrically connecting a cable 120c for a display 120 to the external device connection I/F 118 described later is provided toward the left-side wall 1140 of the casing 1100.

The following description use the term "operation key(s) 108" for indicating an arbitrary one or ones of the operation keys (108a to 108e), and the term "connection port(s) 1132" for indicating an arbitrary one or ones of the connection ports (1132a to 1132c).

Next, the arm 1200 is attached to the casing 1100 via a torque hinge 1210 and is configured to be rotatable in the vertical direction within the range of a tilt angle θ1 of 135 degrees with respect to the casing 1100. FIG. 4 indicates a state in which the tilt angle θ1 is 90 degrees. The camera housing 1300 has a built-in camera 112 provided thereon, which will be described later, and the camera 112 can capture an image of a user, a document, a room, or the like. In addition, the camera housing 1300 has a torque hinge 1310 formed thereon. The camera housing 1300 is, attached to the arm 1200 via the torque hinge 1310 and is configured to be rotatable in the vertical and horizontal directions within the range of a pan angle θ2 of ±180 degrees and a tilt angle θ3 of ±45 degrees with respect to the arm 1200, in which the state illustrated in FIG. 4 serves as 0 degrees.

Note that the external view illustrated in FIG. 4 is only exemplary and the appearance is not restricted thereto. The communication terminal 10 may be, for example, a general personal computer (PC), a smart phone, or a tablet terminal. The camera 112 and the microphone 114 need not necessarily be built-in devices and may be external devices. Since the communication management system 50 has the same appearance as that of a general server computer, a description of the appearance thereof is omitted.

Figure 5:
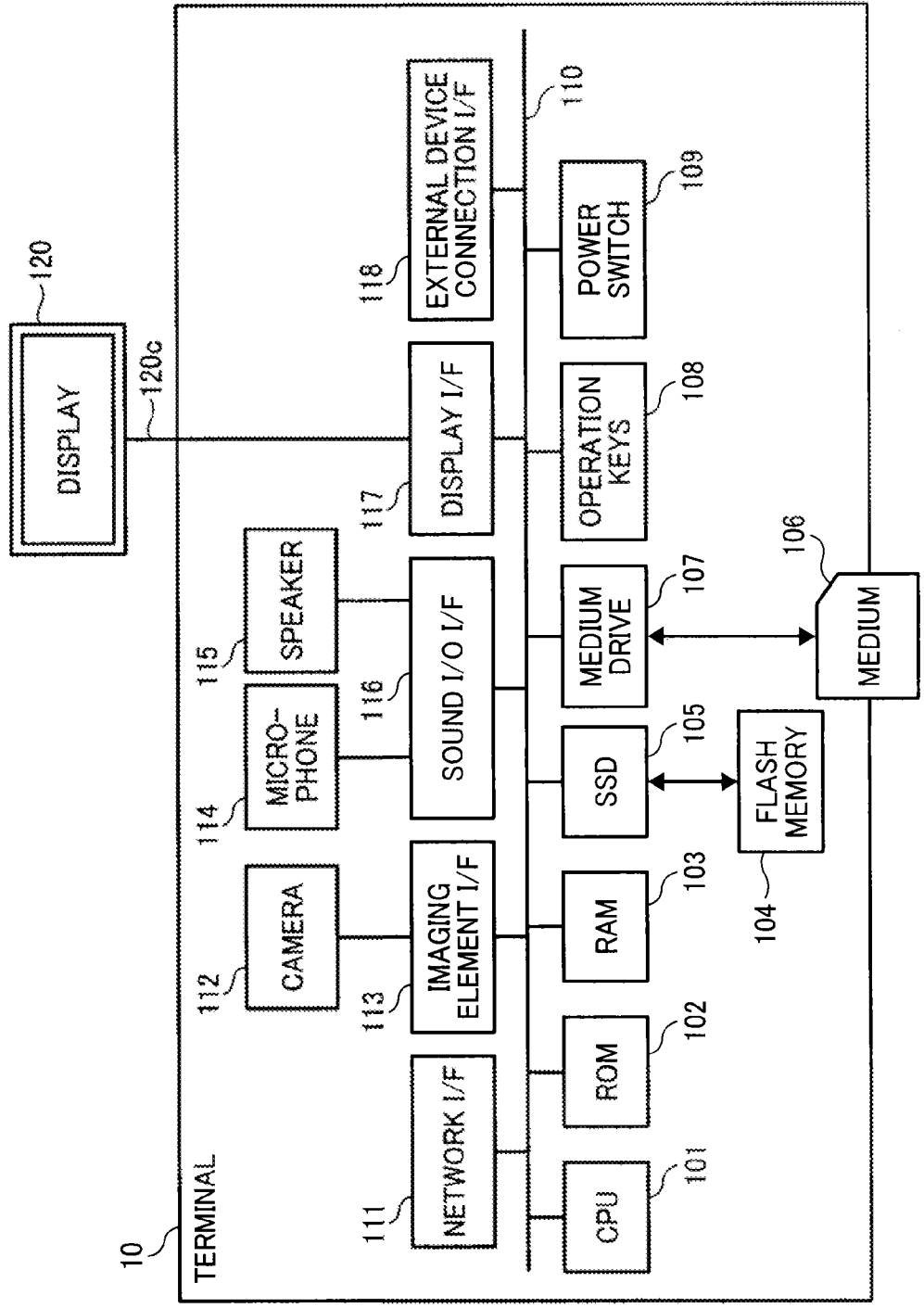
FIG. 5 is a hardware configuration diagram of the terminal of FIG. 4.

FIG. 5 is a hardware configuration diagram of a terminal 10 according to the embodiment of the present invention. As illustrated in FIG. 5, the terminal 10 of the embodiment includes a central processing unit (CPU) 101 that controls the over-all operation of the terminal 10, a read-only memory (ROM) 102 that stores a program used for driving the CPU 101, such as, an initial program loader (IPL), a random-access memory (RAM) 103 used as a work area for the CPU 101, a flash memory 104 that stores various types of data, such as the terminal program, image data, and sound data, a solid state drive (SSD) 105 that controls reading/writing of various types of data from/to the flash memory 104 under control of the CPU 101, a medium drive 107 that controls reading/writing (storage) of data from/to a recording medium 106, the operation keys 108 operated in the case of, for example, selecting a counterpart terminal of the terminal 10, the power switch 109 for turning on/off the power of the terminal 10, and a network interface (I/F) 111 for transmitting data using the communication network 2.

In addition, the terminal 10 includes the built-in camera 112, which captures an image of a subject and obtains image data under control of the CPU 101, an imaging element I/F 113 that controls driving of the camera 112, the built-in microphone 114, which receives a sound input, the built-in speaker 115, which outputs sounds, a sound input/output I/F 116 that processes inputting/outputting of a sound signal between the microphone 114 and the speaker 115 under control of the CPU 101, a display I/F 117 that transmits image data to an external display 120 under control of the CPU 101, the external device connection I/F 118 for connecting various external devices, and a bus line 110 such as an address bus and a data bus for electrically connecting the above-described elements as illustrated in FIG. 5.

The display 120 is a display formed of liquid crystal or organic electroluminescence (EL) that displays an image of a subject, an operation icon, or the like. In addition, the display 120 is connected to the display I/F 117 by the cable 120c. The cable 120c may be an analog, red green blue (ROB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using, a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

Note that the recording medium 106 includes a storage medium such as a Secure Digital (SD) memory card or a Subscribe Identity Module (SIM) card. The recording medium 106 is configured to be removable from the terminal 10. In addition, a non-volatile memory that reads or writes data under control of the CPU 101 is not limited to the flash memory 104, and an electrically erasable and programmable read-only memory (EEPROM) may be used instead.

Further, the terminal program may be recorded in a file in an installable format or an executable format on a computer-readable recording medium such as the recording medium 106 and distributed. In addition, the terminal program may be stored on the ROM 102, instead of the flash memory 104.

Figure 6:
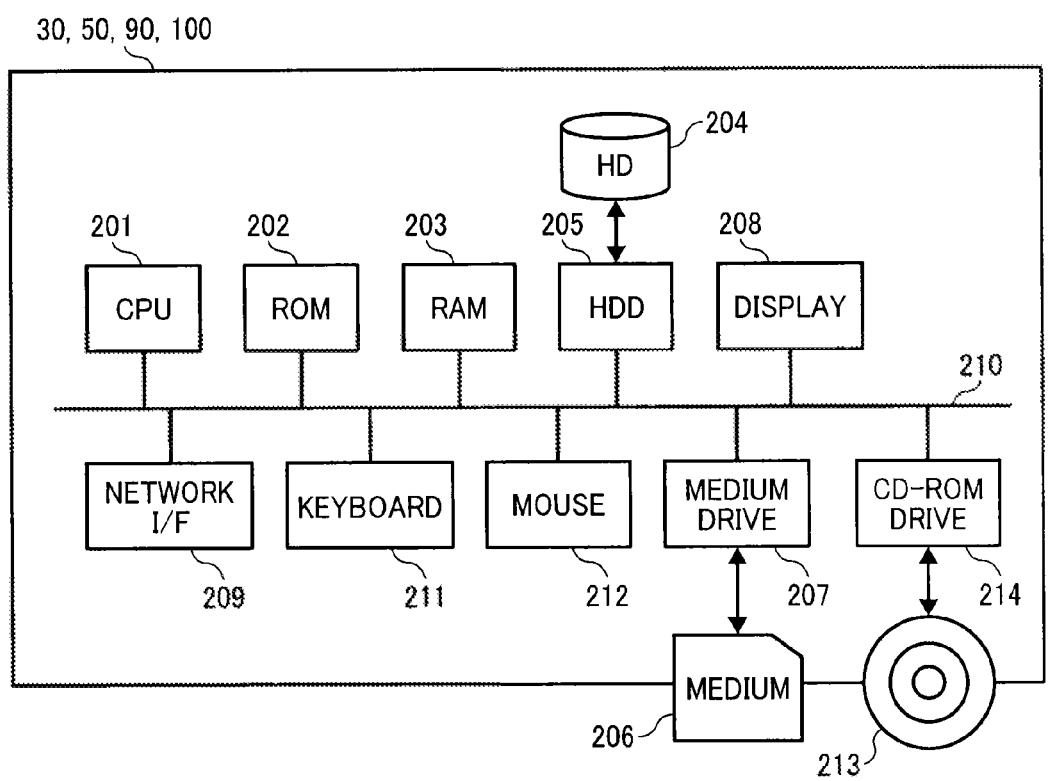
FIG. 6 is a hardware configuration diagram of a management system, a relay device, or a program providing system of the system of FIG. 1 according to the embodiment.

FIG. 6 is a hardware configuration diagram of the management system 50 according to the embodiment. The management system 50 includes a CPU 201 that controls the overall operation of the management system 50, a ROM 202 that stores a program used for driving the CPU 201, such as an IPL, a RAM 203 used as a work area for the CPU 201, the HD 204, which stores various types of data, such as the transmission management program, a hard disk drive (HDD) 205 that controls reading/writing of various types of data from/to the HD 204 under control of the CPU 201, a medium drive 207 that controls reading/writing (storage) of data from to a recording medium 206 such as, a flash memory, a display 208 that, displays various types of information such as, a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions, selects a processing target, and moves the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements, as illustrated in FIG. 6.

Note that the transmission management program may be recorded in a file in an installable format or an executable format on a computer-readable recording, medium such as the recording medium 206 or the CD-ROM 213 and distributed. In addition, die transmission management program may be stored on the ROM 202, instead of the HD 204.

In addition, since the relay devices 30 have a hardware configuration that is die same as or similar to that of the above-described management system 50, a description thereof is omitted. Note that the HD 204 stores a relay device program for controlling the relay devices 30. Also in this case, the relay device program may be recorded in a file in an installable format or an executable format on a computer-readable recording medium such as the recording medium 206 or the CD-ROM 213 and distributed. In addition, the relay device program may be stored on the ROM 202, instead of the HD 204.

In addition, since the program providing system 90 and the maintenance system 100 each have a hardware configuration that is the same as or similar to that of the above-described management system 50, descriptions thereof are omitted. Note that the HD 204 stores a program providing program for controlling the program providing system 90. Also in this case, the program providing program may be recorded in a file in an installable format or an executable format on a computer-readable recording medium such as the recording medium 206 or the CD-ROM 213 and distributed. In addition, the program providing program may be stored on the ROM 202, instead of the HD 204.

Note that each of the above-described programs may be recorded on a computer-readable recording medium such as a compact disc recordable (CD-R), a digital versatile disk (DVD), or a Blu-ray disk, which serve as other examples of the above-described removable recording medium, and may be provided.

<Functional Configuration of Transmission System>

Figure 7:
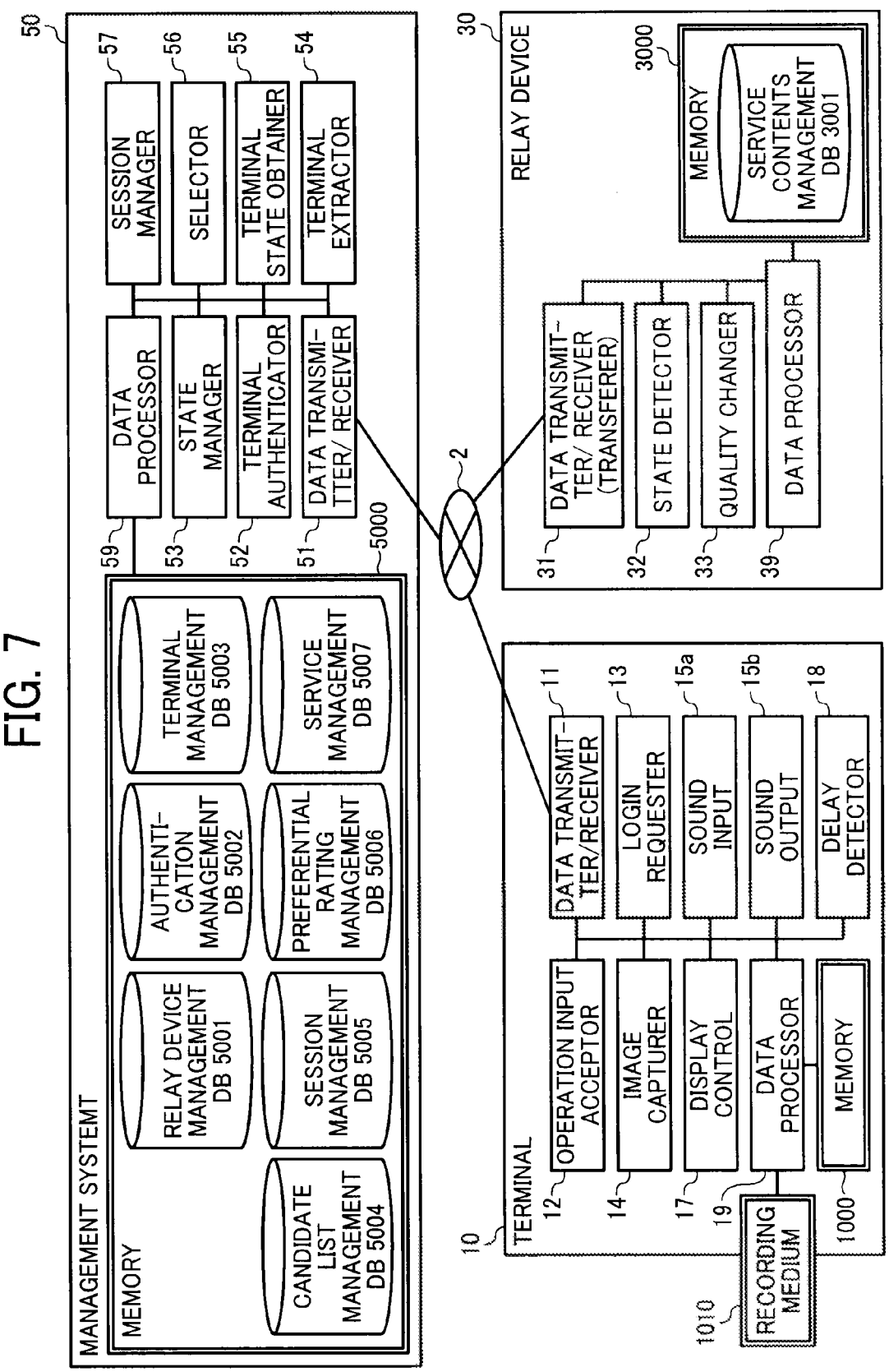
FIG. 7 is a functional block diagram of terminal, device, and system included in the transmission system of FIG. 1 according to the embodiment.

Next, the functional configuration of the embodiment will be described. FIG. 7 is a functional block diagram of each terminal, device, and system included in the transmission system 1 of the embodiment. In FIG. 7, the terminal 10, the relay device 30, and the management system 50 are connected to be capable of communicating data via the communication network 2. In addition, since the program providing system 90 illustrated in FIG. 1 is not directly related to videoconference communication, the program providing system 90 is omitted in FIG. 7.

(Functional Configuration of Terminal)

The terminal 10 includes a data transmitter/receiver 11, an operation input acceptor 12, a login requester 13, an image capturer 14, a sound input 15a, a sound output 15b, a display control 17, a delay detector 18, and a data processor 19. These units are functions that are realized by or units that function by operating any of the elements illustrated in FIG. 5 in response to a command from the CPU 101 in accordance with a terminal program expanded from the flash memory 104 to the RAM 103. The terminal 10 also includes a memory 1000 configured by the RAM 103 illustrated in FIG. 5, and the flash memory 104 illustrated in FIG. 5. Further, a recording medium 1010 configured by the recording medium 206 illustrated in FIG. 6 is inserted into the terminal 10, and the data processor 19 reads/writes various types of data. As described below, in this embodiment, the recording medium 1010 stores therein a service ID for identifying each service that the terminal 10 is able to request the management system 50. Alternatively, the service ID may be stored in the memory 1000 of the terminal 10.

Next, using FIGS. 5 and 7, functional configuration of the terminal 10 will be described in detail. Note that, in the following description of functional configuration of the terminal 10, among elements illustrated in FIG. 5, relationships with main elements for realizing the functional configuration of the terminal 10 will also be described.

The data transmitter/receiver 11 of the terminal 10 illustrated in FIG. 7 is implemented by a command from the CPU 101 illustrated in FIG. 5 and by the network I/F 111 illustrated in FIG. 5, and performs transmission/reception of various types of data (or information) to/from another terminal, device, or system via the communication network 2. Before starting communication with a desired counterpart terminal, the data transmitter/receiver 11 starts receiving, from the management system 50, state information indicating the state of each terminal serving as a candidate counterpart terminal. The state information not only indicates the operating state of each terminal 10 (whether the terminal 10 is online or offline), but also indicates a detailed state such as whether the terminal 10 whose state is online is now capable of communicating or is currently communicating, or the user of the terminal 10 is not at the terminal 10. In addition, the state information not only indicates the operating state of each terminal 10, but also indicates various states, such, as the state that the cable 120c is disconnected from the terminal 10, the state that the terminal 10 can output sounds but not images, or the state that the terminal 10 is muted. Hereinafter, the case in which the state information indicates the operating state will be described by way of example.

The operation input acceptor 12 is implemented by a command from the CPU 101 illustrated in FIG. 5 and by the operation keys 108 and the power switch 109 illustrated in FIG. 5, and accepts various inputs from the user. For example, when the user turns on the power switch 109 illustrated in FIG. 5, the operation input acceptor 12 illustrated in FIG. 7 accepts the power on operation and turns on the power.

The login requester 13 is implemented by a command from the CPU 101 illustrated in FIG. 5, and, upon acceptance of the above described power on operation, automatically transmits, from the data transmitter/receiver 11 to the management system 50 via the communication network 2, login request information indicating a login request, and the current IP address of the request sender terminal. In addition, when the user turns the power switch 109 from on to off, the data transmitter/receiver 11 transmits to the management system 50 state information indicating that the power is to be turned off, and then the operation input acceptor 12 completely turns off the power. Accordingly, the management system 50 can detect that the power of the terminal 10 is turned from on to off.

The image capturer 14 is implemented by a command from the CPU 101 illustrated in FIG. 5 and by the camera 112 and the imaging element I/F 113 illustrated in FIG. 5. The image capturer 14 captures an image of a subject and outputs image data obtained by capturing the image.

The sound input 15a is implemented by a command from the CPU 101 illustrated in FIG. 5 and by the sound input/output I/F 116 illustrated in FIG. 5. After the sound of the user is converted to a sound signal by the microphone 114, the sound input 15a receives, sound data according to this sound signal. The sound output 15b is implemented by a command from the CPU 101 illustrated in FIG. 5 and by the sound input/output I/F 116 illustrated in FIG. 5, and outputs the sound signal according to the sound data to the speaker 115, and the speaker 115 outputs sound.

The display control 17 is implemented by a command from the CPU 101 illustrated in FIG. 5 and by the display I/F 117 illustrated in FIG. 5, and performs control for combining items of received image data having different resolutions and transmitting the combined image data to the display 120, as will be described later. The display control 17 can also transmit information on a candidate list, received from the management system 50, to the display 120, and control display of the candidate list on the display 120.

The delay detector 18 is implemented by a command from the CPU 101 illustrated in FIG. 5, and detects a delay time (ms) of image data or sound data transmitted from another terminal 10 via a relay device 30.

The data processor 19 is, implemented by a command from the CPU 101 illustrated in FIG. 5 and by the SSD 105 illustrated in FIG. 5, or by a command from the CPU 101, and performs processing to store various types of data in the memory 1000 or to read various types of data stored in the memory 1000. The memory 1000 stores a terminal identification (ID) for identifying the terminal 10, a password, and the like. Further, every time image data and sound data are received in performing communication with a counterpart terminal, the memory 1000 overwrites the image data and sound data. On the basis of image data before being overwritten, an image is displayed on the display 120, and, on the basis of sound data before being overwritten, sound is output front the speaker 115.

Note that a terminal ID, a later-described relay device ID, and a later-described service ID in the embodiment indicate examples of identification information such as a language, a character(s), a symbol(s), or various marks used to uniquely identify a corresponding terminal 10, a corresponding relay device 30, and corresponding service contents are not limited in these examples. In addition, a terminal ID, a relay device ID, and a service ID may be identification information including a combination of at least two of the above-mentioned language, character(s), symbol(s), and various, marks.

Instead of a terminal ID, a user ID for identifying the user of a terminal 10 may be used. In this case, terminal identification information includes not only the terminal ID, but also the user ID.

(Functional Configuration of Relay Device)

The relay device 30 includes, a data transmitter/receiver 31, a state detector 32, a quality changer 33, and a data processor 39. These units are functions that are implemented by or that are caused to function by operating any of the elements illustrated in FIG. 6 in response to a command from the CPU 201 in accordance with a relay device program expanded from the HD 204 to the RAM 203. The relay device 30 also includes a memory 3000 configured by the RAM 203 illustrated in FIG. 6 and/or the HD 204 illustrated in FIG. 6.

(Service Contents Management Table)

Figures 8, 9, 10:
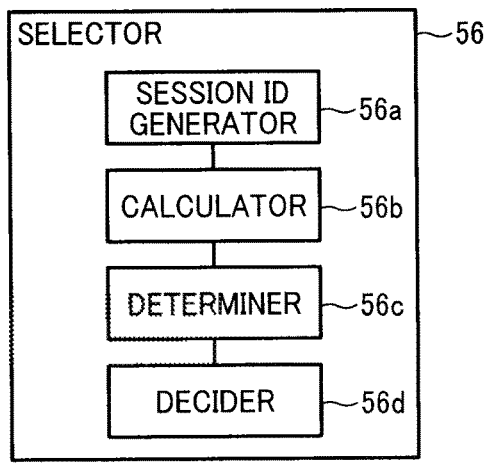
FIG. 8 is a functional diagram of a selector.
FIG. 9 is an illustration of a service contents management table, managed by a relay device, according to an embodiment of the present invention.
FIG. 10 is an illustration of a coefficient table used in calculating a preferential rating.

The memory 3000 stores a service contents management database (DB) 3001 configured by a service contents management table such as that illustrated in FIG. 9. In the service contents management table, a service ID for identifying a service and information regarding the contents of the service are stored in association with each other, for each service that the relay device 30 controls relaying of content data. FIG. 9 illustrates an image quality parameter and a sound quality parameter serving as examples of information describing the service contents. Among them, a service ID is an example of identification information for identifying a service provided to the user of a specific terminal 10 by the operator of the management system 50. In this example, the operator or administrator of the management system 50 is a service provider providing a specific service to the user through the transmission system 1. An image quality parameter is an example of information describing the service contents provided by the provider at the management system 50 and indicates the quality of an image. Exemplary image quality parameters include a frame bit, a bit rate, a resolution, and a color depth. FIG. 9 illustrates exemplary frame rates. The higher the parameter, the better the image quality, and thus the better the service contents provided by the provider at the management system 50. A sound quality parameter is another example of information describing the service contents provided by the provider at the management system 50 and indicates the quality of a sound. Exemplary sound quality parameters include a sampling rate, a bit rate, and a quantization bit rate. FIG. 9 illustrates exemplary sampling rates. The higher the parameter, the better the sound quality, and thus the better the service contents provided by the provider at the management system 50.

Note that another exemplary image quality parameter or sound quality parameter includes information indicating an encoding method (encoding format). In the case where one terminal 10 is capable of selecting a plurality of encoding methods (such as H.264/AVC, H.264/SVC, and H.265) and performing processing, the terminal 10 encodes image data and sound data using an encoding method selected by the user.

As described below, the service contents management table in the memory 3000 is updated with information received from the management system 50.

(Functional Configuration of Relay Device)

Next, functional configuration of a relay device 30 will be described in detail. Note that, in the following description of functional configuration of the relay device 30, among elements illustrated in FIG. 6, relationships with main elements for realizing functional configuration of the relay device 30 will also be described.

The data transmitter/receiver 31 of the relay device 30 illustrated in FIG. 7 is implemented by a command from the CPU 201 illustrated in FIG. 6 and by the network I/F 209 illustrated in FIG. 6, and performs transmission/reception of various types of data (or information) to/from another terminal, device, or system via the communication network 2. The data transmitter/receiver 31 also serves as a transferer and transfers image data and sound data transmitted from a first transmission terminal 10 to a second transmission terminal 10.

The state detector 32 is implemented by a command from the CPU 201 illustrated in FIG. 8, and detects the operating state of the relay device 30 including this state detector 32. The possible operating states are "online", "offline", "communicating", and "interrupted".

The quality changer 33 is implemented by a command from the CPU 201 illustrated in FIG. 6, refers to a service ID in the service contents management table (see FIG. 9), and changes the quality of image data and the quality of sound data according to an image quality parameter and a sound quality parameter.

The data processor 39 is implemented by a command from the CPU 201 illustrated in FIG. 6 and the HDD 205 illustrated in FIG. 6, and performs processing to store various types of data in the memory 3000 or read various types of data stored in the memory 3000.

<Functional Configuration of Management System>

The management system 50 includes a data transmitter/receiver 51, a terminal authenticator 52, a state manager 53, a terminal extractor 54, a terminal state obtainer 55, a selector 56, a session manager 57, and a data processor 59. These units are functions that are implemented by or that are caused to function by operating any of the elements illustrated in FIG. 6 in response to, a command from the CPU 201 in accordance with a management system program expanded from the HD 204 to the RAM 203. In addition, the management system 50 includes a memory 5000 configured by the HD 204 illustrated in FIG. 6.

(Relay Device Management Table)

The memory 5000 stores a relay device management DB 5001 configured by a relay device management table such as that illustrated in FIG. 11. In the relay device management table, for the relay device ID of each relay device 30, the operating state of the relay device 30, the date/time received at which state information indicating the operating state is received by the management system 50, the IP address of the relay device 30, the maximum data transfer rate (Mbps) of the relay device 30, and a coefficient used in the case of selecting the relay device 30 are stored in association with one another. For example, the relay device management table illustrated in FIG. 11 indicates that the relay device 30a with the relay device ID "111a" has the operating state "online", the date/time received at which state information is received by the management system 50 "Apr. 10, 2014, 13:00", the IP address "1.2.1.2", the maximum data transfer rate "100 Mbps", and the coefficient "0.9".

Here, a coefficient in the relay device management table will be described. This coefficient is used in calculating a preferential rating in the case of selecting a corresponding relay device 30. The hither the value of the coefficient, the more likely the relay device 30 will be selected. The coefficient is derived by obtaining the average of indices such as those illustrated in FIG. 10. Note that FIG. 10 is an illustration of a coefficient table used in calculating a preferential rating.

As illustrated in FIG. 10, the provider at the management system 50 (the administrator of the management system 50), for example, defines the value of each index for each relay device ID. In FIG. 10, a running cost, a reliability, and a device size are defined as exemplary indices. Among them, the running cost is the amount spent to maintain or manage each relay device 30. The reliability indicates the unlikeliness that an error or a failure occurs in each relay device 30 and indicates, for example, a mean time between failures. The device size indicates the size of hardware and software. The greater the number of terminals 10, the greater the need becomes to increase the device size. For example, in the case, of the, relay device ID "111a", the running cost is "0.8", the reliability is "1", and the device size is "0.9". Thus, the coefficient, which is the average of these indices, is $0.9(=(0.8+1+0.9)/3)$.

(Authentication Management Table)

The memory 5000 further stores an authentication management DB 5002 configured by an authentication management table such as that illustrated in FIG. 12. In the authentication management table, a password is stored in association with each of terminal IDs of all terminals 10 managed by the management system 50. For example, the authentication management table illustrated in FIG. 12 indicates that the terminal ID of the terminal 10aa is "01aa", and the password of the terminal 10aa is "aaaa".

(Terminal Management Table)

The memory 5000 also stores a terminal management DB 5003 configured by a terminal management table such as that illustrated in FIG. 13, in the terminal management table, for the terminal ID of each terminal 10, a counterpart terminal name in the case where the terminal 10 serves as a counterpart terminal, the operating state of the terminal 10, a date/time received at which login request information described later is received by the management system 50, and the IP address of the terminal 10 are stored in association with one another. For example, the terminal management table illustrated in FIG. 13 indicates that the terminal 10aa with the terminal ID "01aa" has the counterpart terminal name "AA terminal, Tokyo office, Japan", the operating state "online (communication OK)", the date/time received at which login request information is received by the management system 50 "Apr. 10, 2014, 13:40", and the IP address "1.2.1.3".

(Candidate List Management Table)

The memory 5000 further stores a candidate list management DB 5004 configured by a candidate list management table such as, that illustrated in FIG. 14. In the candidate list management table, the terminal IDs of all counterpart terminals 10 registered as candidate counterpart terminals are stored in association with the terminal ID of a request sender terminal that sends a request to start communication in a videoconference. For example, the candidate list management table illustrated in FIG. 14 indicates that candidates for a counterpart terminal to which a request sender terminal (terminal 10aa) whose terminal ID is "01aa" can send a request to start communication in a videoconference are the terminal 10ab whose terminal ID is "01ab", the terminal 10ba whose terminal ID is "01ba", the terminal 10bb whose terminal ID is "01bb", and so forth. The candidate counterpart terminals are updated by addition or deletion in response to an addition or deletion request received from an arbitrary request sender terminal to the management system 50.

(Session Management Table)

The memory 5000 also stores a session management DB 5005 configured by a session management table such as that illustrated in FIG. 15. In the session management table, for each session ID used in execution of a session for selecting a relay device 30, the relay device ID of a relay device 30 used in relaying image data and sound data, the terminal ID of a request sender terminal, the terminal ID of a counterpart terminal, a reception delay time (ms) in the case where the counterpart terminal receives image data, and a date/time received at which delay information indicating this delay time is transmitted from the counterpart terminal and received by the management system 50 are stored in association with one another.

(Preferential Rating Management Table)

The memory 5000 further stores a preferential rating management DB 5006 configured by a preferential rating management table such as that illustrated in FIG. 16. In the preferential rating management table, for each terminal 10, preferential rating information indicating a preferential rating that each relay device 30 is selected is managed. Specifically, for each terminal ID, preferential ratings that the terminal 10 indicated by the terminal ID uses a plurality of relay devices 30 are managed in association with each other. Here, the greater the value of the preferential rating, the higher the preferential rating. For example, from a viewpoint of the terminal 10aa (terminal ID "01aa"), it is indicated that the relay device 30a (relay device ID "111a"), which has the preferential rating "100", has the highest preferential rating among a plurality of relay devices 30, and thus is selected. It is, indicated that the next selected is the relay device 30b (relay device ID "111b") with the preferential rating "90", the next next selected is the relay device 30c (relay device ID "111c") with the preferential rating "70", and the last selected is the relay device 30d (relay device ID "111d") with the preferential rating "50".

Note that the terminal ID "01ab" includes the area ID "a" indicating the area after "01", and "b" for identifying the terminal after "a". That is, it can be represented that, in FIG. 16, for each area ID, preferential ratings that each terminal 10 uses a plurality of relay devices 30 are managed in association with each other. The area ID is also used as an ID for identifying a particular group.

Preferential ratings in each terminal 10 are set on the basis of a round trip time (RTT) described later, and the management system 50 centrally manages preferential ratings in all the terminals 10. For example, the preferential rating management table illustrated in FIG. 16 indicates that, in the terminal 10aa with the terminal ID "01aa", the preferential rating of the relay device 30a with the relay device ID "111a" is set to "100", which is higher than the preferential ratings (90, 70, and 50) of relay devices (30b, 30c, and 30d) indicated by other relay device IDs ("111b", "111c", and "111d").

Figures 17, 18:
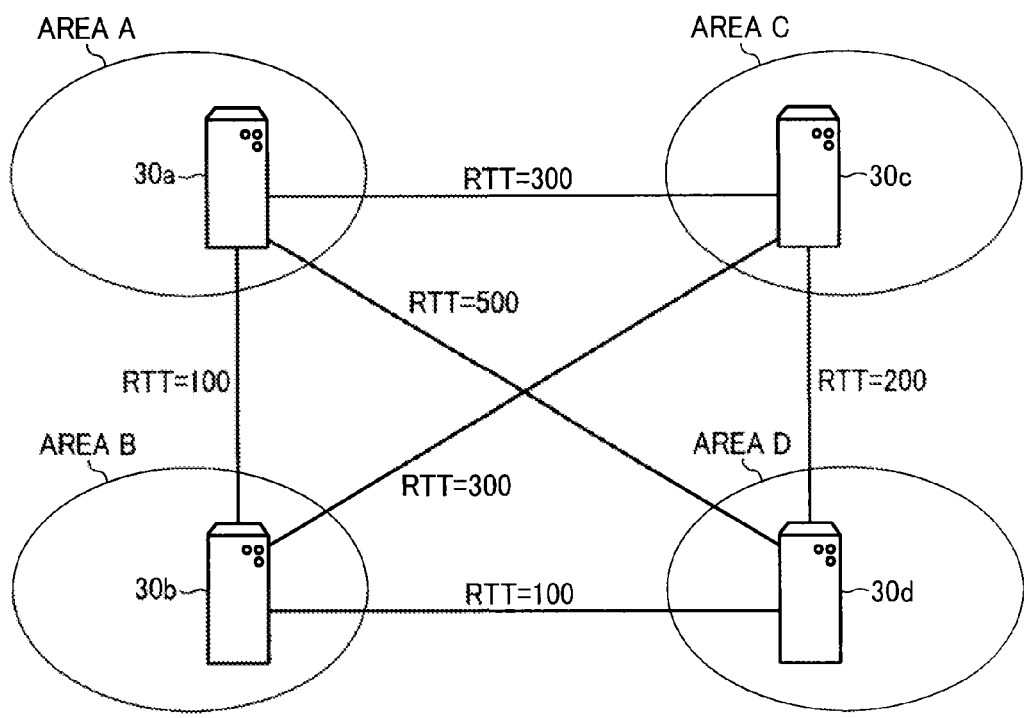
FIG. 17 is an illustration of a service contents management table, managed by a management system, according to an embodiment of the present invention.
FIG. 18 is an illustration of a round trip time (RTT) between relay devices in a communication network.

Here, an RTT will be described using FIG. 18. Note that FIG. 18 is an illustration of the RTT between relay devices 30 in the communication network 2. The RTT indicates a time involved in transmission/reception when a first relay device 30 transmits ping to a second relay device 30. For example, FIG. 18 indicates that RTT=100 (ms) in the case, where the relay device 30a located in the area A transmits ping to the relay device 30b located in the area B. Each preferential rating is calculated by equation (1).

$$100-(RTT/10) \quad (1)$$

Note that RTT=0 is calculated in the case where the sender and the receiver are located in the same area, as in the case of the terminal 10aa and the relay device 30a. For example, from a viewpoint of a terminal 10 in the area A, the preferential rating that the relay device 30b in the area B is selected is 90 (=100−(100/10)).

Although area IDs are included in terminal IDs in FIG. 16, the case is not limited thereto, and terminal IDs and area IDs may be managed in different fields.

(Service Management Table)

The memory 5000 further stores a service management DB 5007 configured by a service management table such as that illustrated in FIG. 17. The service management table manages, for each service that can be provided by the management system 50, a service ID in association with an image quality parameter and a sound quality parameter. Since these service IDs, image quality parameters, and sound quality parameters are the same as the service IDs, image quality parameters, and sound quality parameters managed in the service contents management table (see FIG. 9), descriptions thereof will be omitted. Note that information regarding the service contents in the service management table (see FIG. 17) are, for example, parameters set by the provider at the management system 50. As described below referring to S65, the management system 50 transmits information regarding the service contents, obtained from the service contents management table of FIG. 17 to the relay device 30. The relay device 30 then stores the information regarding the service contents in the service contents management table of FIG. 9.

<Functional Configuration of Management System>

Next, functional configuration of the management system 50 will be described in detail. Note that, in the following description of functional configuration of the management system 50, among elements illustrated in FIG. 6, relationships with main elements for realizing functional configuration of the management system 50 will also be described.

The data transmitter/receiver 51 is implemented by a command from the CPU 201 illustrated in FIG. 6 and by the network I/F 209 illustrated in FIG. 6, and performs transmission/reception of various types of data (or information) to/from another terminal, device, or system via the communication network 2.

The terminal authenticator 52 is implemented by a command from the CPU 201 illustrated in FIG. 6, and performs terminal authentication by searching the authentication management DB 5002 of the memory 5000 by using a terminal ID and a password included in login request information received via the data transmitter/receiver 51 as search keys and determining whether the same pair of a terminal ID and a password is managed in the authentication management DB 5002.

The state manager 53 is implemented by a command from the CPU 201 illustrated in FIG. 6. In order to manage the operating state of a request sender terminal that has sent a login request, the state manager 53 stores and manages the terminal ID of the request sender terminal, the operating state of the request sender terminal, the date/time received at which login request information is received by the management system 50, and the IP address of the request sender terminal in association with one another in the terminal management DB 5003 (see FIG. 13). In addition, on the basis of state information sent from the terminal 10 indicating that power is to be turned off when the user turns the power switch 109 of the terminal 10 from on to off, the state manager 53 changes the operating state indicating an online state to an offline state in the terminal management DB 5003 (see FIG. 13).

The terminal extractor 54 is implemented by a command from the CPU 201 illustrated in FIG. 6, searches the candidate list management DB 5004 (see FIG. 14) by using the terminal ID of a request sender terminal that has sent a login request as a key, and reads the terminal ID of a candidate counterpart terminal that can communicate with the request sender terminal, thereby extracting the terminal ID. The terminal extractor 54 also searches the candidate list management DB 5004 (see FIG. 14) by using the terminal ID of a request sender terminal that has sent a login request as a key, and extracts the terminal ID of another request sender terminal that has the terminal ID of the former-mentioned request sender terminal registered as a candidate for a counterpart terminal.

The terminal state obtainer 55 is implemented by a command from the CPU 201 illustrated in FIG. 6, searches the terminal management DB 5003 (see FIG. 13) by using the terminal ID of a candidate counterpart terminal, extracted by the terminal extractor 54, as a search key, and reads the operating state for each terminal ID extracted by the terminal extractor 54. Accordingly, the terminal state obtainer 55 can obtain the operating state of a candidate counterpart terminal that can communicate with a request sender terminal that has sent a login request. The terminal state obtainer 55 also searches the terminal management DB 5003 by using the terminal ID extracted by the terminal extractor 54 as a search key, and obtains the operating state of a request sender terminal that has sent a login request.

The selector 56 is implemented by a command from the CPU 201 illustrated in FIG. 6, and performs an operation of consequently selecting one relay device 30 from among a plurality of relay devices 30. More specifically, the selector 56 includes a session ID generator 56*a*, a calculator 56*b*, a determiner 56*c*, and a decider 56*d*, as illustrated in FIG. 8, which is implemented by a command from the CPU 201 of FIG. 6.

Among these units, the session ID generator 56*a* generates a session ID used in executing a session for selecting a relay device 30.

The calculator 56*b* calculates a total preferential rating by adding preferential ratings for each relay device ID. For example, in FIG. 16, from viewpoints of three terminals (10*aa*, 10*ba*, and 10*db*) with the terminal IDs "01 *aa*", "01*ba*", and "01*db*", preferential ratings that these terminals 10 select the relay device 30*a* with the relay device ID "111*a*" are "100", "80", and "50", respectively. Thus, the total preferential rating is 230 (=100+80+50).

The calculator 56*b* also multiples each total preferential rating by a coefficient illustrated in FIG. 11. For example, the coefficient of the relay device 30*a* with the relay device ID "111*a*" is "0.9", and hence the final total preferential rating is 207 (=230*0.9)".

In addition, the determiner 56*c* determines whether there is only one total preferential rating having the highest value among total preferential ratings multiplied by the above-mentioned respective coefficients.

Further, the decider 56*d* decides on, among a plurality of relay device IDs, a relay device ID according to a total preferential rating having, the highest value among total preferential ratings multiplied by the above-mentioned respective coefficients. In the case where there is a plurality of total preferential ratings having the highest value, the decider 56*d* decides on a relay device ID according to a total preferential rating randomly selected from among the plurality of total preferential ratings having the highest value.

Note that the calculator 56*b* need not use the above-mentioned coefficients. That is, the calculator 56*b* may not multiply a total preferential rating by a coefficient. In this case, the decider 56*d* decides on, among a plurality of relay device IDs, a relay device ID according to a total preferential rating having the highest value among total preferential ratings that are not multiplied by the above-mentioned respective coefficients.

<Process or Operation>

Figure 19:
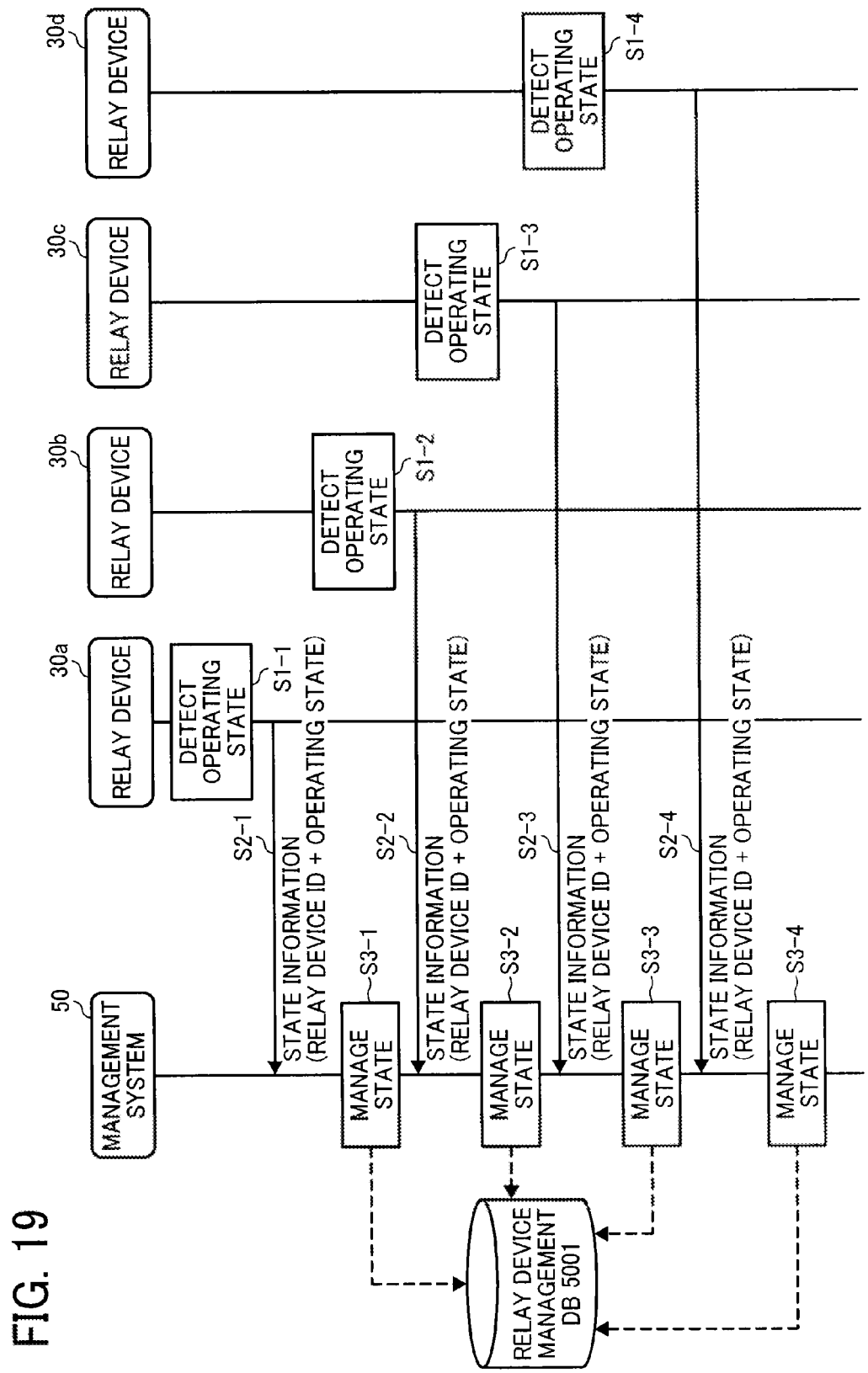
FIG. 19 is a sequence diagram illustrating operation of managing state information indicating the operating state of each relay device.
Figure 20:
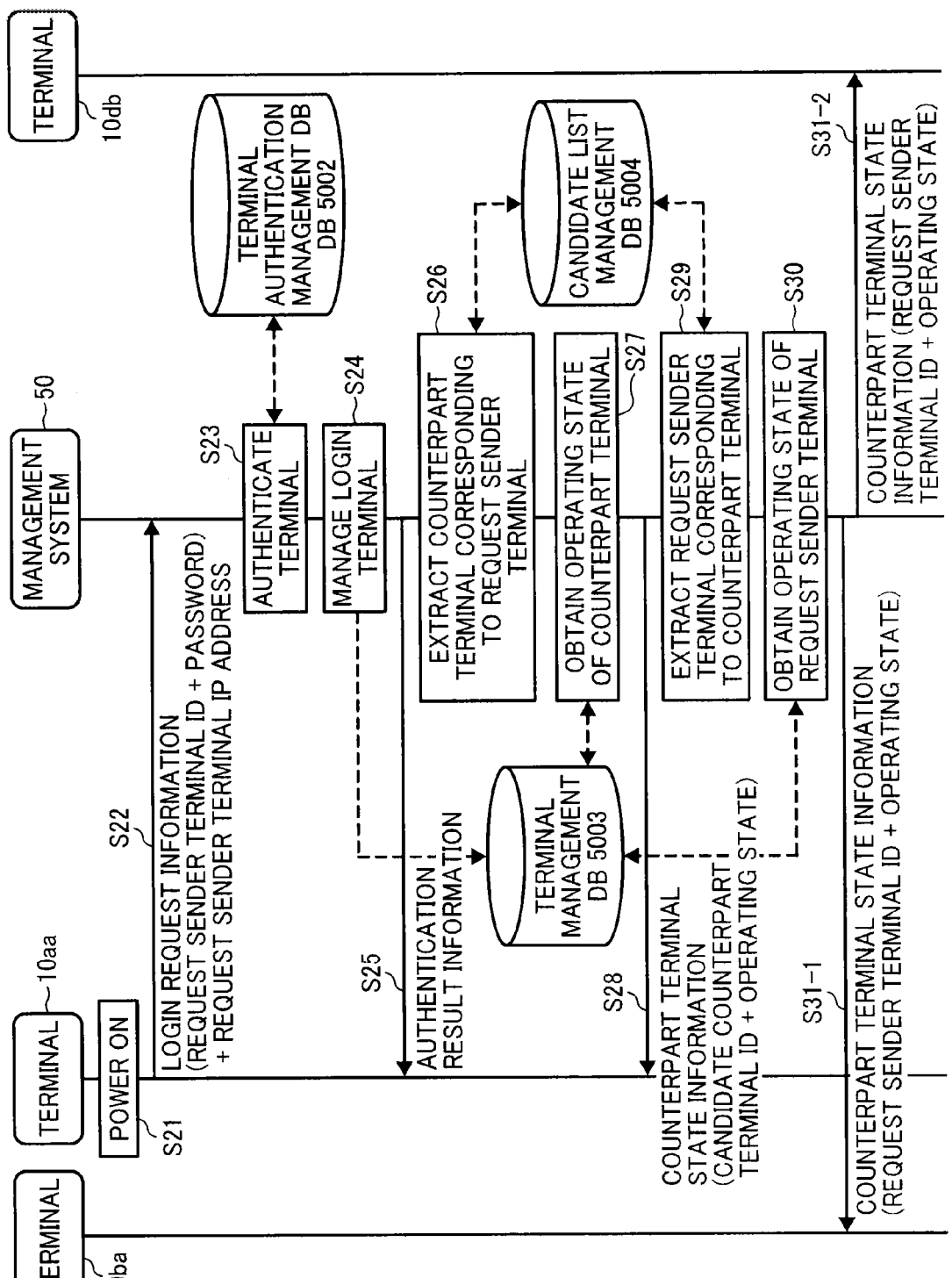
FIG. 20 is a sequence diagram illustrating operation of preparing for starting communication between terminals.
Figure 21:
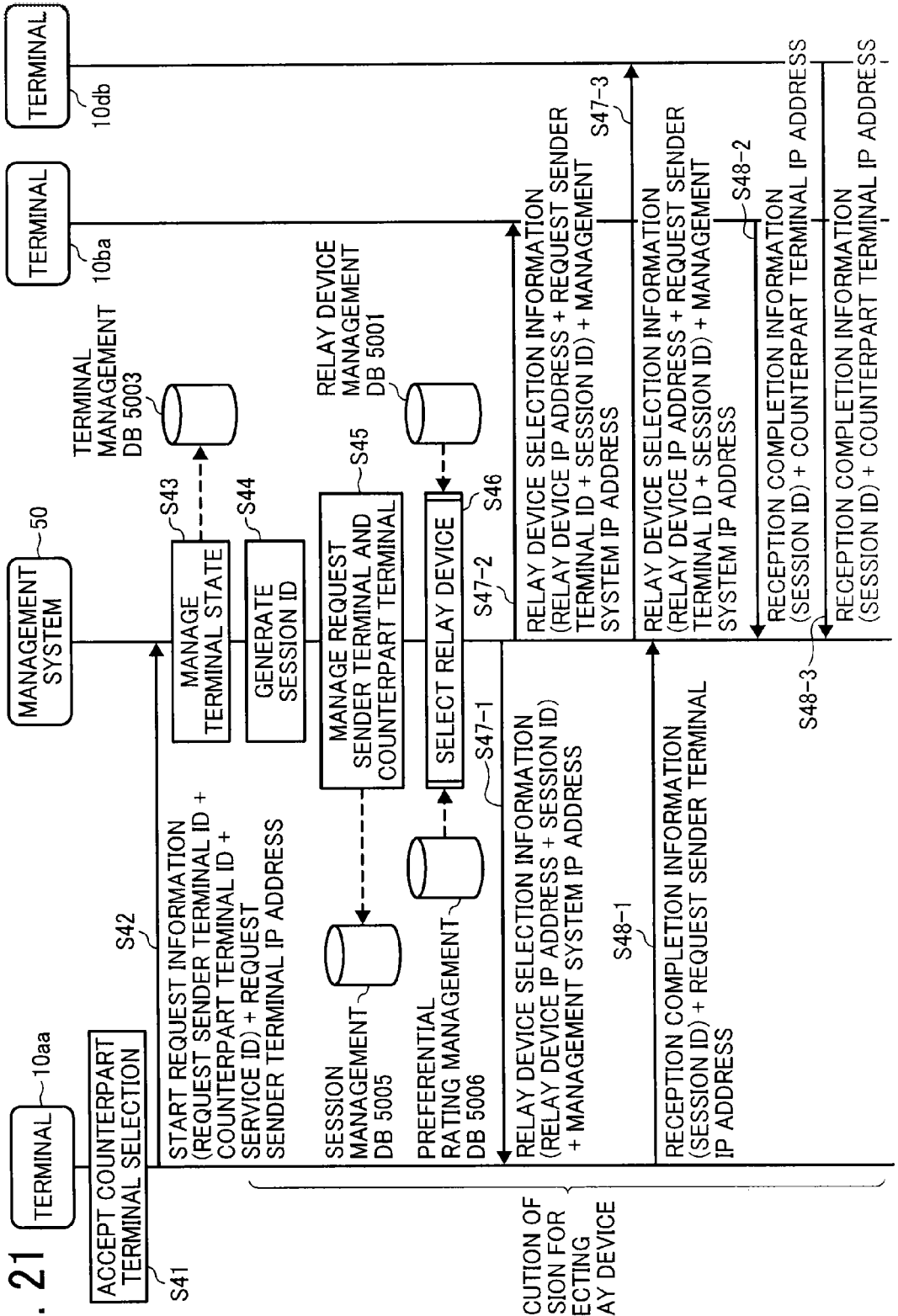
FIG. 21 is, a sequence diagram illustrating operation of selecting a relay device.
Figure 22:
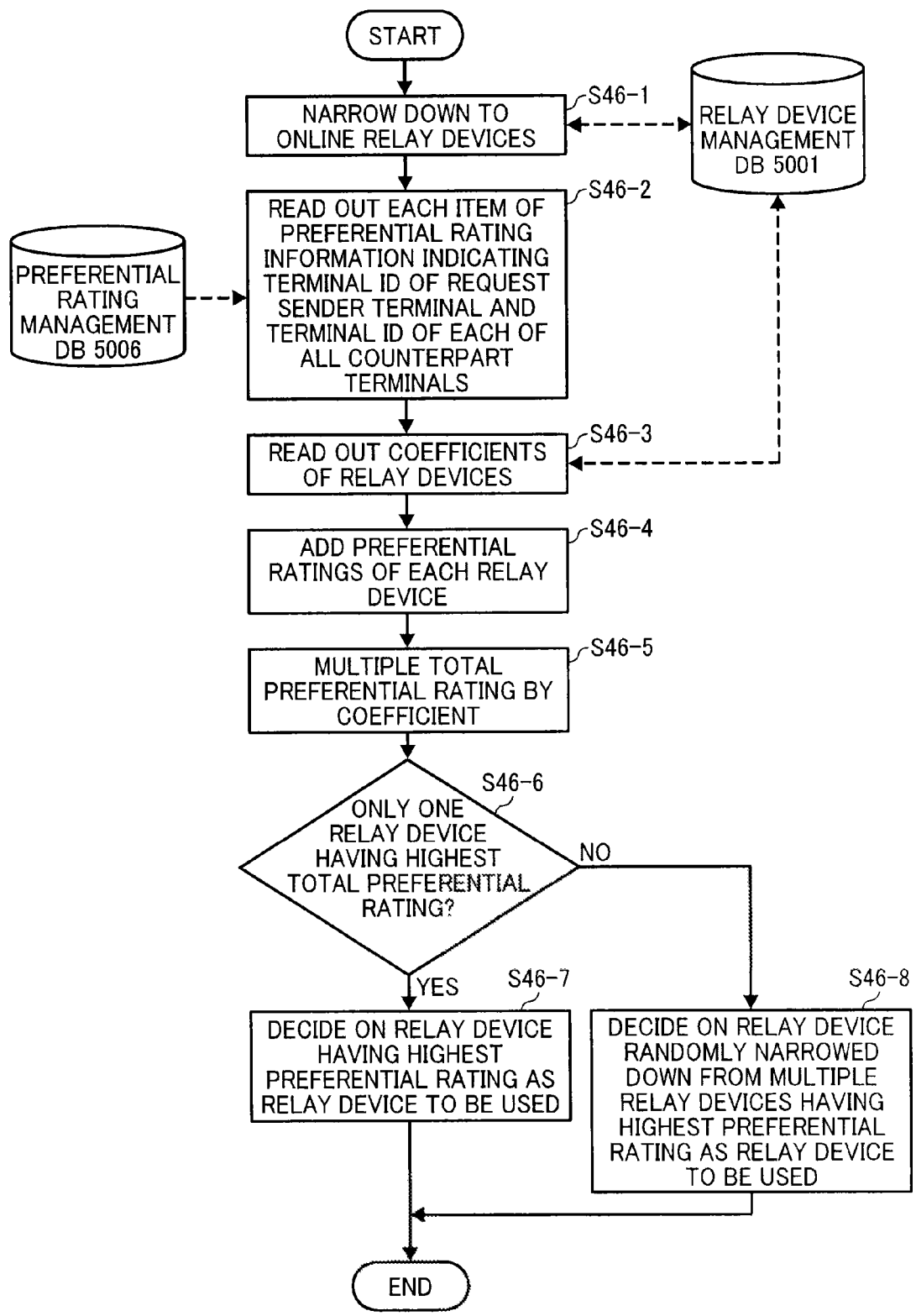
FIG. 22 is a flowchart illustrating operation of selecting a relay device.
Figure 23:
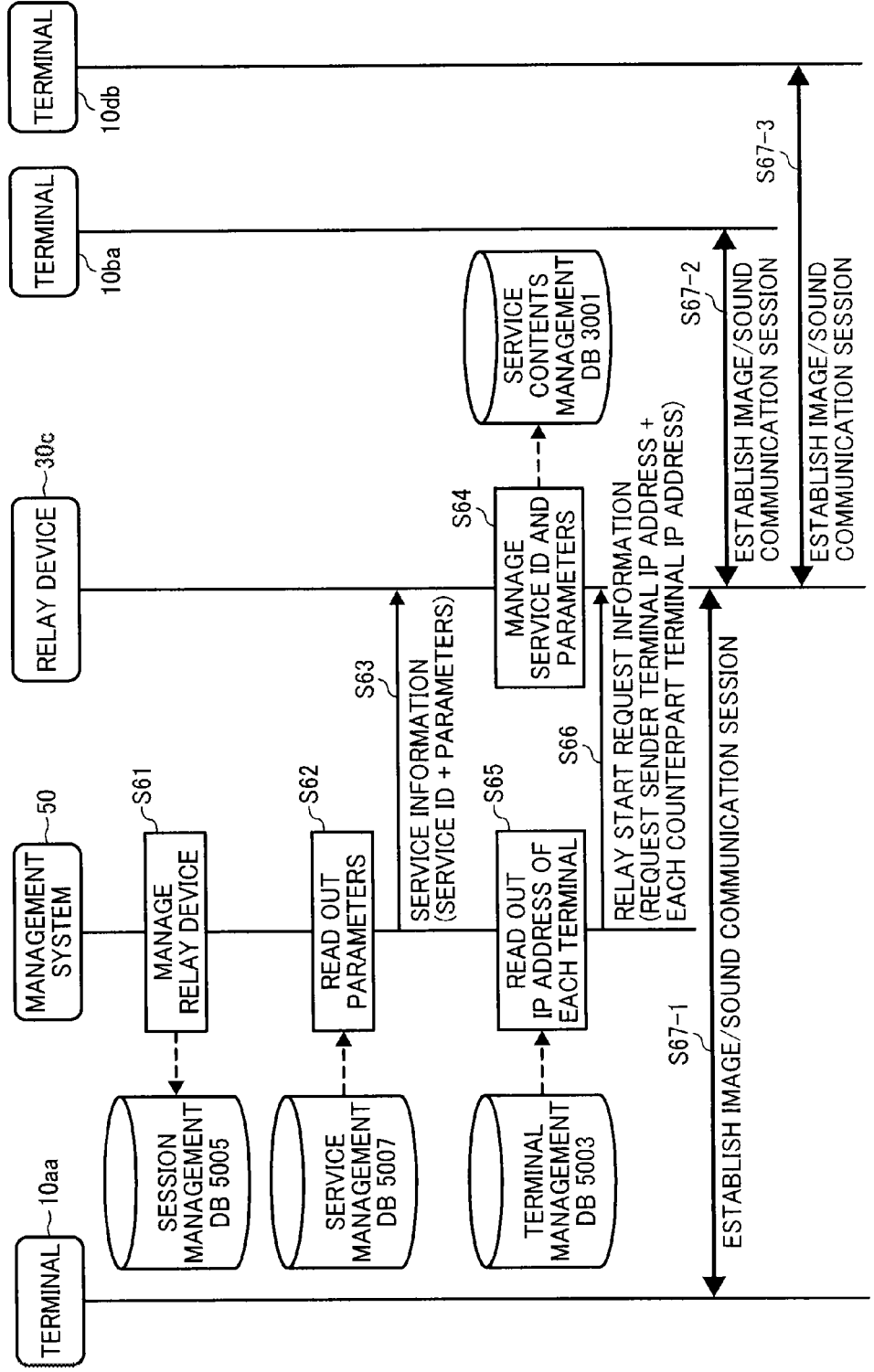
FIG. 23 is a sequence diagram illustrating operation of establishing a communication session.
Figure 24:
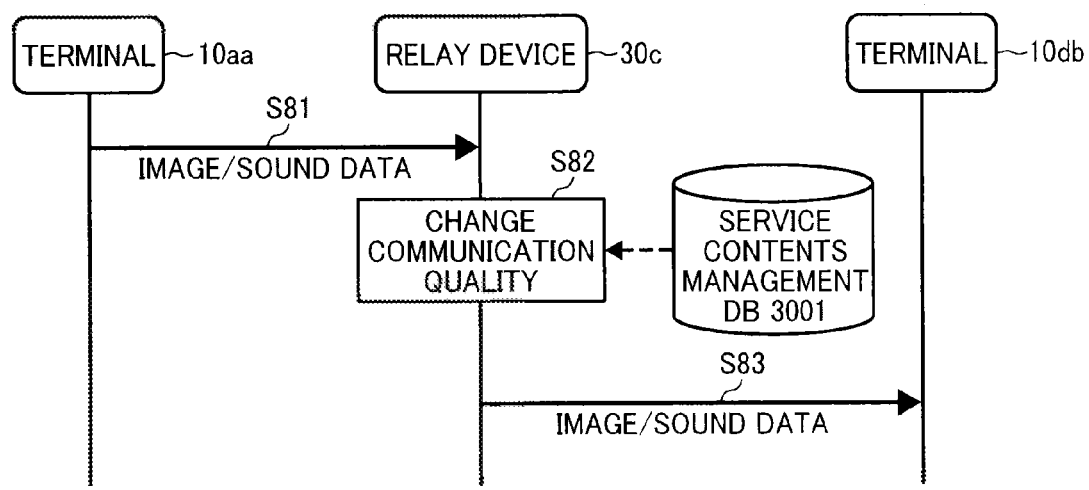
FIG. 24 is a sequence diagram illustrating operation of transmitting or receiving image data and sound data between transmission terminals.

Next, operation performed by the transmission system 1 according to the embodiment will be described using FIGS. 19 to 24. Note that FIG. 19 is a sequence diagram illustrating, operation of managing state information, transmitted from each relay device 30 to the management system 50, indicating the state of the relay device 30. FIG. 20 is a sequence diagram illustrating operation of preparing to start communication between a plurality of terminals 10. FIG. 20 is a sequence diagram illustrating operation of preparing to start remote communication between terminals 10. FIG. 21 is a sequence diagram illustrating operation of selecting a relay device 30. FIG. 22 is a flowchart illustrating operation of selecting a relay device 30. FIG. 23 is a sequence diagram illustrating operation of establishing a communication session. FIG. 24 is a sequence diagram illustrating operation of transmitting/receiving image data and sound data between transmission terminals 10.

First, operation of managing state information, transmitted from each relay device 30 to the management system 50, indicating the state of the relay device 30 will be described using FIG. 19. First, in each relay device 30, the state detector 32 illustrated in FIG. 7 periodically detects the operating state of the relay device 30, which is the local device (steps S1-1 to S1-4), In order to cause the management system 50 to manage the operating state of each relay device 30 in real time, the data transmitter/receiver 31 of each relay device 30 periodically transmits its state information to the management system 50 via the communication network 2 (step S2-1 to S2-4). The state information includes the relay device ID of each relay device 30, and the operating state detected by the state detector 32 of the relay device 30 according to that relay device ID. Note that the embodiment discusses the case where, while the relay devices (30*a*, 30*b*, and 30*d*) are normally operating and are "online", the relay device 30*c*, which is operating, is "offline" since some sort of failure has occurred in a program for executing a relay operation of the relay device 30*c*.

Next, in the management system 50, the data transmitter/receiver 51 receives the state information transmitted from each relay device 30, and stores and manages the state information according to each relay device ID in the relay device management DB 5001 (see FIG. 11) of the memory 5000 via the data processor 59 (steps S3-1 to S3-4). Accordingly, in the relay device management table such as that illustrated in FIG. 11, one of the operating states "online", "offline", and "out of order" is stored and managed according to each relay device ID. In this case, for each relay device ID, the date/time received at which the state information is received by the management system 50 is additionally stored. In the case where no state information is sent from a relay device 30, an operating state field and a date/time received field in each record in the relay device management table illustrated in FIG. 11 become blank, or the previous operating state and the date/time received at which the previous operating state is received are shown.

Next, operation of transmitting/receiving each item of management information at a preparation step before starting communication among three places, namely, the terminal 10*aa*, the terminal 10*ba*, and the terminal 10*db*, will be described using FIG. 20. Note that, in FIG. 20, various items of management information are entirely transmitted/received by the management information session sei illustrated in FIG. 2.

First, when the user of a request sender terminal (terminal 10*aa*) turns on the power switch 109 illustrated in FIG. 4, the operation input acceptor 12 illustrated in FIG. 7 accepts the power on operation and turns on the power (step S21). In response to acceptance of the power on operation, the login requester 13 automatically transmits login request information indicating a login request from the data transmitter/receiver 11 to the management system 50 via the communication network 2 (step S22). Note that the login request, information may be transmitted in response to operation of the operation keys 108 by the user, instead of turning on of the power switch 109. The login request information includes a terminal ID for identifying the terminal 10*aa*, which is a local terminal serving as a request sender, and a password. The terminal ID and the password are data that have been read via the data processor 19 from the memory 1000 and sent to the data transmitter/receiver 11. Alternatively, the terminal ID and the password may be recorded on the recording medium 1010 and may be read out from the recording medium 1010. In the case of transmitting login request information from the terminal 10*aa* as to the management system 50, the management system 50, which is a receiving side, can detect the IP address of the terminal 10*aa*, which is a transmitting side.

Next, the terminal authenticator 52 of the management system 50 performs terminal authentication, by searching the authentication management DB 5002 (see FIG. 12) of the memory 5000 by using the terminal ID and the password included in the login request information received via the data transmitter/receiver 51 as search keys, and determining whether the same terminal ID and the same password are managed in the authentication management DB 5002 (step S23). In the case where the terminal authenticator 52 determines that the login request is a login request received from a terminal 10 that has a legitimate use authority since the same terminal ID and the same password are managed, the state manager 53 stores, in the terminal management DB 5003 (see FIG. 13), the terminal ID of the terminal 10*aa*, the operating state, the date/time received at which the above-described login request information is received, and the IP address of the terminal 10*aa* in association with one another (step S24). Accordingly, the operating state "online" the date/time received "4.10.20141.13:40", and the IP address "1.2.1.3" of the terminal 10*aa* are managed in association with the terminal ID "01*aa*" in the terminal management table illustrated FIG. 13.

The data transmitter/receiver 51 of the management system 50 transmits authentication result information indicating an authentication result obtained by the terminal authenticator 52 to the request sender terminal (terminal 10*aa*) which has sent the above-mentioned login request, via the communication network 2 (step S25). In the embodiment, the case in which it has been determined by the terminal authenticator 52 that the terminal 10*aa* is a terminal that has a legitimate use authority will be described as follows.

The terminal extractor 54 of the management system 50 searches the candidate list management DB 5004 (see FIG. 14) by using the terminal ID "01*aa*" of the request sender terminal (terminal 10*aa*) which has sent the login request as a search key, and reads out and thereby extracts the terminal ID of a candidate counterpart terminal that can communicate with the request sender terminal (terminal 10*aa*) (step S26). Here, for example, the terminal IDs ("01*ab*", "01*ba*", and "01*db*") of counterpart terminals (terminals 10*db*, 10*ba*, and 10*db*) corresponding to the terminal ID "01*aa*" of the request sender terminal (terminal 10*aa*) are extracted.

Next, the terminal state obtainer 55 searches the terminal management DB 5003 (see FIG. 13) by using the terminal IDs ("01*ab*", "01*ba*", and "01*db*") of the counterpart terminals, which are extracted by the above-mentioned terminal extractor 54, as search keys, and reads corresponding operating states for the,individual terminal IDs extracted by the above-mentioned terminal extractor 54, thereby obtaining the operating states of the terminals (10*ab*, 10*ba*, and 10*db*) (step S27).

Next, the data transmitter/receiver 51 transmits counterpart terminal state information including the terminal IDs ("01*ab*", "01*ba*", and "01*db*") serving as the search keys used in step S27 described above and the operating states ("offline", "online", and "online") of the counterpart terminals (terminals 10*ab*, 10*ba*, and 10*db*) corresponding to these terminal IDs to the request sender terminal (terminal 10*aa*) via the communication network 2 (step S28). In doing so, the request sender terminal (terminal 10*aa*) can obtain the current operating states ("offline", "online", and "online") of the terminals (10*ab*, 10*ba*, and 10*db*) that are candidates for a counterpart terminal that can communicate with the request sender terminal (terminal 10*aa*).

The terminal extractor 54 of the management system 50 further searches the candidate list management DB 5004 (see FIG. 14) by using the terminal ID "01*aa*" of the request sender terminal (terminal 10*aa*) which has sent the login request as a search key, thereby extracting the terminal ID of another request sender terminal that registers the terminal ID "01*aa*" of the above-mentioned request sender terminal (terminal 10*aa*) as a candidate for a counterpart terminal (step S29). In the candidate list management table illustrated in FIG. 14, the terminal IDs of other request sender terminals that are extracted are "01*ab*", "01*ba*", and "01*db*".

Next, the terminal state obtainer 55 of the management system 50 searches the terminal management DB 5003 (see FIG. 13) by using the terminal ID "01*aa*" of the request sender terminal (terminal 10*aa*) which has sent the login request as a search key, and obtains the operating state of the request sender terminal (terminal 10*aa*) which has sent the login request (step S30).

The data transmitter/receiver 51 transmits counterpart terminal state information including the terminal ID "01*aa*" and the operating state "online" of the request sender terminal (terminal 10*aa*), obtained in above-described step S30, to terminals (10*ba* and 10*db*) whose operating states are "online" in the terminal management DR 5003 (see FIG. 13), among the terminals (10*ab*, 10*ba*, and 10*db*) according to the terminal IDs ("01*ab*", "01*ba*", and "01*db*") extracted in above-described step S29 (steps S31-1 and S31-2). When transmitting the counterpart terminal state information to the terminals (10*ba* and 10*db*), the data transmitter/receiver 51 refers to the IP addresses of the terminals, which are managed in the terminal management table illustrated in FIG. 13, on the basis of the terminal IDs ("01*ba*" and "01*db*"). Accordingly, the terminal ID "01*aa*" and the operating state "online" of the request sender terminal (terminal 10*aa*) which has sent the login request can be transmitted to other counterpart terminals (terminals 10*db* and 10*ba*) that, can communicate with the request sender terminal (terminal 10*aa*), serving as a counterpart terminal, which has sent the login request.

In contrast, in the other terminals 10, as in above-described step S21, when the user turns on the power switch 109 illustrated in FIG. 6, the operation input acceptor 12 illustrated in FIG. 7 accepts the power on operation and performs processing that is the same as or to above-described steps S22 to S31-1 and S31-2, descriptions of which are omitted.

Next, operation of selecting a relay device 30 will be described using FIG. 21. Note that, in FIG. 21, various items of management information are entirely transmitted/received by the management information session sei illustrated in FIG. 2. In the embodiment, the request sender terminal (terminal 10*aa*) can communicate with, among terminals 10 serving as candidate counterpart terminals, at least one of the terminals (10*ba* and 10*db*) whose operating states are online in accordance with the terminal state information received in above-described step S28. Here, the following description will discuss the case in which, the user of the request sender terminal (terminal 10*aa*) selects to start communication with the counterpart terminal (terminal 10*ba*) and the counterpart terminal (10*db*).

First, when the user presses the operation keys 108 illustrated in FIG. 5 and, selects the terminals 10*ba* and 10*db*, the operation input acceptor 12 illustrated in FIG. 7 accepts a request for starting communication with the counterpart terminals (terminal 10*ba* and terminal 10*db*) (step S41). The data transmitter/receiver 11 of the request sender terminal (terminal 10*aa*) transmits, to the management system 50, start request information indicating a request for starting communication (step S42). The start request information includes the terminal ID "01*aa*" of the terminal 10*aa*, the terminal IDs ("01*ba*" and "01*db*") of the counterpart terminals (terminal 10*ba* and terminal 10*db*), and the service ID of the request sender terminal (terminal 10*aa*). Accordingly, the data transmitter/receiver 51 of the management system 50 can obtain the above-mentioned start request information, and detect the IP address "1.2.1.3" of the request sender terminal (terminal 10*aa*), which is the transmission source. The service ID is read out by the data processor 19 from the recording medium 1010, and transmitted by the data transmitter/receiver 11.

On the basis of the terminal ID "01*aa*" of the request sender terminal (terminal 10*aa*) and the terminal IDs ("01*ba*" and "01*db*") of the counterpart terminals (terminal 10*ba* and terminal 10*db*), which are included in the start request information, the state manager 53 changes the operating state field of each &records including the abovementioned terminal IDs "01*aa*", "01*ba*", and "01*db*" to "communicating" in the terminal management table (see FIG. 13) (step S43). Note that, in this state, although the request, sender terminal (terminal 10*aa*), the counterpart terminal (terminal 10*ba*), and the counterpart terminal (terminal 10*db*) have not started communicating, these terminals enter a communicating state, and, if another terminal 10 tries to communicate with the request sender terminal (terminal 10*aa*), the counterpart terminal (terminal 10*ba*), or the counterpart terminal (terminal 10*db*), a notification sound or display that indicates that the terminal is communicating is output.

Next, operation of executing a session for selecting a relay device 30 to be actually used will be described. First, the session ID generator 56*a* illustrated in FIG. 8 generates a session ID used in executing a session for selecting a relay device 30 (step S44). Here, the session ID "sel" is generated.

In the session management table (see FIG. 15) of the memory 5000, the session manager 57 stores and manages the session ID "sel" generated in above-described step S44, the terminal ID "01*aa*" of the request sender terminal (terminal 10*aa*), and the terminal ID "01*ba*" of the, counterpart terminal (terminal 10*ba*) in association with one another as a record on the first column, and stores and manages the same session ID "sel" generated in above-described step S44, the terminal ID "01*aa*" of the request sender terminal (terminal 10*aa*), and the terminal ID "01*db*" of the counterpart terminal (terminal 10*db*) in association with one another as a record on the second column (step S45).

Next, the selector 56 of the management system 50, illustrated in FIG. 8, selects a relay device 30 for relaying communication among three sites, namely, the request sender terminal (terminal 10*aa*), the counterpart terminal (terminal 10*ba*), and the counterpart terminal (terminal 10*db*), on the basis of the relay device management DB 5001 and the preferential rating management DB 5006 (step S46).

Here, the processing in step S46 will be described in more detail using FIGS. 7 and 22. First, the data processor 59 illustrated in FIG. 7 narrows down relay device IDs that are managed in the relay device management table (see FIG. 11) to relay device IDs whose operating states are online (step S46-1). Since only the relay device ID "111*b*" is offline in FIG. 11, the relay device 30*b* indicated by the relay device ID "111*b*" is excluded from being selected.

Next, the data processor 59 reads out, from the preferential rating management table (see FIG. 16), the terminal ID of a request sender terminal and each item of preferential rating information indicating a preferential rating of the terminal ID of each of all counterpart terminals (step S46-2). Here, items of preferential rating information for all relay device IDs except for the relay device ID "111*b*" are read out.

Next, the data processor 59 searches the relay device management table (see FIG. 11) by using all the relay device IDs except for the relay device ID "111*b*" as search keys, thereby reading out corresponding coefficients (step S46-3).

Next, the calculator 56*b* of the selector 56 adds preferential ratings of each relay device 30 except for the relay device 30*b*, thereby deriving a total preferential rating (step S46-4). For example, in the case where the request sender terminal is the terminal 10*aa* (terminal ID "01*aa*") and the counterpart terminals are the terminal 10*ba* (terminal ID "01*ba*") and the terminal 10*db* (the terminal ID "01*db*"), in FIG. 16, the total preferential rating of the relay device 30*a* (relay device ID "111*a*") is 230 (=100+80+50).

Next, the calculator 56*b* multiples the total preferential rating of each relay device 30 by a corresponding coefficient in the relay device management table (see FIG. 11), thereby calculating a final total preferential rating (step S46-5).

Next, the determiner 56*c* of the selector 56 determines whether there is only one relay device ID having the highest final total preferential rating (step S46-6). In the example illustrated in FIG. 16, the final total preferential rating of the relay device ID "111*a*" is 207 (=230*0.9); the final total preferential rating of the relay device ID "111*c*" is 213.4 (=220*0.97); and the final total preferential rating of the relay device ID "111*d*" is 192 (=240*0.8). Therefore, the determiner 56*c* determines that there is only one relay device ID having, the highest final total preferential rating, namely, "111*c*".

Next, in the case where it is determined in above-described step S46-6 that there is only one relay device ID having, the highest final total preferential rating (YES), the decider 56*d* decides on a relay device indicated by the relay device ID with the highest final preferential rating as a relay device to be actually used (step S46-7). In the example illustrated in FIGS. 10 and 11, the relay device 30*c* indicated by the relay device ID "111*c*" is decided as a relay device to be actually used.

In contrast, in the case where it is determined in above-described step S46-6 that there is more than one relay device ID having the highest final total preferential rating (NO), the decider 56d decides on a relay device indicated by a relay device ID that has been randomly (arbitrarily) narrowed down from a plurality of relay device IDs that consequently have the highest total preferential rating as a relay device to be actually used (step S46-8).

When the above operation of selecting a relay device in step S46 ends, the data transmitter/receiver 51 illustrated in FIG. 7 transmits relay device selection information to the request sender terminal (terminal 10aa) via the communication network 2 (step S47-1). The relay device selection information includes the IP address of the relay device 30c selected in above-described step S46, and the session ID "sel" generated in above-described step S44. Accordingly, the request sender terminal (terminal 10aa) can obtain the IP address of the management system 50, which is the transmission source of the relay device selection information.

Further, the data transmitter/receiver 51 transmits the relay device selection information to the counterpart terminal (terminal 10ba) via the communication network 2 (step S47-2). The relay device selection information includes the IP address of the relay device 30c selected in above-described step S46, the terminal ID "01aa" of the request sender terminal (terminal 10aa), and the session ID "sel" generated in above-described step S44. Accordingly, the counterpart terminal (terminal 10ba) can obtain, in execution of a session with the session ID "sel ", the IP address of the management system 50, which is the transmission source of the relay device selection information. The management system 50 also transmits the same relay device selection information as that transmitted to the counterpart terminal (terminal 10ba) to the other counterpart terminal (terminal 10db) (step S47-3). Also in this case, the counterpart terminal (terminal 10db) can obtain, in execution of a session with the session ID "sel", the IP address of the management system 50, which is the transmission source of the relay device selection information.

Next, in response to the, processing in above-described step S47-1, the request sender terminal (terminal 10aa) transmits, from the data transmitter/receiver 11 to the management system 50 via the communication network 2, reception completion information indicating completion of reception of the relay device selection information through the processing in above-described step S47-1 (step S48-1). The reception completion information includes the session ID transmitted/received in the processing in above-described step S47-1. Accordingly, the management system 50 can obtain information indicating completion of transmission of the relay device selection information, executed with the particular session ID "sel", and the IP address of the request sender terminal (terminal 10aa), which is the transmission source.

Next, in response, to the processing in above-described step S47-2, the counterpart terminal (terminal 10ba) similarly transmits, to the management system 50, reception completion information indicating completion of reception of the relay device selection information through the processing in above-described step S47-2 (step S48-2). Also in this case, the management system 50 can obtain information indicating completion of transmission, of the relay device selection information, executed with the particular session ID "sel", and the IP address of the counterpart terminal (terminal 10ba), which is the transmission source. Also, in response to the processing in above-described step S47-3, the counterpart terminal (terminal 10db) similarly transmits, to the management system 50, reception completion information indicating completion of reception of the relay device selection information through the processing in above-described step S47-3 (stop S48-3). Also in this case, the management system 50 can obtain information indicating completion of transmission of the relay device selection information, executed with the particular session ID "sel", and the IP address of the counterpart terminal (terminal 10db), which is the transmission source.

Next, referring to FIG. 23, the session manager 57 of the management system 50 stores and manages the relay device ID of the relay device 30c, which has been consequently selected as one relay device, in a relay device ID field of a record including the session ID "sel" in the session management table (see FIG. 15) (step S61). In the example illustrated in FIG. 15, the relay device ID "111c" is stored and managed in relay device ID fields of records on the first column and the second column.

Next, the data processor 59 of the management system 50 searches the service management table (see FIG. 17) by using the service ID received in step S42 described above as a search key, thereby reading corresponding parameters (step S62).

The data transmitter/receiver 51 of the management system 50 transmits service information to the above-selected relay device 30 via the communication network 2 (step S63). The service information includes the service ID received in the above-described processing in step S42, and the parameters (service contents information) read in the above-described processing in step S62. At S63, the data transmitter receiver 51 of the management system 50 transmits service information to the relay device 30c, and the data transmitter/receiver 31 of the relay device 30c receives the service information.

Next, the data processor 39 of the relay device 30c newly stores and manages the service ID and the parameters, received in above-described step S63, in association with each other in the service contents management table (see FIG. 9) (step S64).

Further, at S63, the data transmitter/receiver 51 may transmit the session ID "sel" indicating a communication session to be established among the terminals 10aa, 10ba, and 10db via the relay device 30c. This session ID may be associated with the service ID.

Next, the data processor 59 of the management system 50 searches the terminal management table (see FIG. 13) by using the terminal IDs of the request sender terminal (terminal 10aa), the counterpart terminal (terminal 10ba), and the counterpart terminal (terminal 10db), received in the processing in above-described step S42, as search keys, thereby reading corresponding IP addresses (step S65).

The data transmitter/receiver 51 of the management system 50 transmits relay start request information indicating a request for starting relaying to the above-selected relay device 30c via the communication network 2 (step S66). The relay start request information includes the IP addresses read out in the above-described processing in step S65. In the example illustrated in FIG. 16, since the relay start request information is transmitted to the relay device 30c, the data transmitter/receiver 31 of the relay device 30c receives the relay start request information. Accordingly, the relay device 30c can detect that the relay device 30c, which is the local device, has been selected. Thus, the relay device 30c establishes a session, for communicating image data having three resolutions, namely, low resolution, intermediate resolution, and high resolution, and sound data between the terminals (10aa, 10ba, and 10db) (step S67-1, S67-2, and S67-3).

Thus, the terminals (10aa, 10ba, and 10db) can start a videoconference among three sites.

Accordingly, although communication among three places, namely, the terminal 10aa in the area A, the terminal 10ba in the area B, and the terminal 10db in the area D, is performed, the relay device 30c in the area C is used by taking into consideration the speed balance in transmitting/receiving content data in an environment of the communication network 2.

Next, using FIGS. 7 and 24, operation of transmitting/receiving image data and sound data for performing videoconference communication between the request sender terminal (terminal 10aa) and the counterpart terminal (terminal 10db), among the terminals (10aa, 10ba, and 10db) in order to simplify the description, will be described. Since the one-way operation of transmitting image data and sound data from the terminal 10aa to the terminal 10db and the other-way operation of transmitting image data and sound data from the terminal 10db to the terminal 10aa are the same processing in terms of transmission/reception of image data and sound data and later-described delay time detection, the former-mentioned one-way communication will be described, and the latter-mentioned other-way communication will be omitted.

First, the request sender terminal (terminal 10aa) transmits image data of a subject, captured by the image capturer 14, and sound data of sounds, input by the sound input 15a, from the data transmitter/receiver 11 to the relay device 30c via the communication network 2 using a session identified by the session ID "sel" (the image/sound data session sed illustrated in FIG. 2 (step S81). In the embodiment, the following description will discuss the case in which the request sender terminal (terminal 10aa) transmits the service ID "sv901" through the processing in above-described step S42 of FIG. 21. Referring to FIG. 23, at S62, the management system 50 reads out the image quality parameter "30" and sound quality parameter "44.1" corresponding to the service ID "sv901", and sends these service information to the relay device 30c. At S64, the relay device 30c stores in the service contents management DB 3001 (FIG. 9) the received service information. After establishing the communication session (S67-1, S67-2, S67-3), referring to FIG. 24, the terminal 10aa transmits image data and sound data through the established communication session at step S81. In this example, it is assumed that image data with the image quality of the parameter "30" and sound data with the sound quality of the parameter "44.1" are transmitted.

In the relay device 30c, upon receipt of the image data and the sound data by the data transmitter/receiver 31, the quality changer 33 refers to die service ID, which is stored in the service contents management table (see FIG. 9), to obtain information regarding quality of the image data and quality of the sound data. More specifically, in this embodiment, the session ID may be associated with a session ID for identifying the session that is established among the terminals 10aa, 10ba, and 10db. More specifically, the quality changer 33 obtains the service 1D associated with the session ID "sel" of the currently managed session, and further obtains the image quality parameter and the sound quality parameter. The quality changer 33 determines whether the quality of the image data and the quality of the sound data, which are transmitted from the request sender terminal 10aa, need to be changed according to the image quality parameter and the sound quality parameter (step S82). In this case, when the quality, of the image data and the quality of the sound data transmitted from the request sender terminal (terminal 10aa) are values that are less than or equal to the image quality parameter and the sound quality parameter, respectively, the quality changer 33 does not change the quality of the image data and the quality of the sound data. In contrast, when the quality of the image data transmitted from the request sender terminal (terminal 10aa) is a value that exceeds the image quality parameter, the quality changer 33 reduces the quality of the image data to the value of the image quality parameter. Similarly, when the quality of the sound data transmitted from the request sender terminal (terminal 10aa) is a value that exceeds the sound quality parameter, the quality changer 33 reduces the quality of the sound data to the value of the sound quality parameter.

The data transmitter/receiver 31 of the relay device 30c transfers the image data and the sound data to the counterpart terminal (terminal 10db) through the image/sound data session sed (step S83). Accordingly, the request sender terminal (terminal 10aa) can transmit image data and sound data having qualities that are based on the service ID of the request sender terminal (terminal 10aa). In the case of transmitting image data and sound data from the counterpart terminal (terminal 10db) to the request sender terminal (terminal 10aa) via the relay device 30c, image data and sound data having qualities that are based on the service ID of the request sender terminal (terminal 10aa) can be transmitted.

As has been described above, according to the embodiment, because the transmission, management system receives a service ID from a request sender, terminal and transmits service contents information to a relay device, the relay device can relay image data and sound data between the request sender terminal and a counterpart terminal by using a communication quality in accordance with the service contents information associated with the service ID received from the request sender terminal.

For example, the service provider may charge the user with higher usage fees, as quality of image data and sound data become higher (that is, when the service contents are high-standard). In such case, the user may not always want to use such high-standard service contents, depending on a particular application or purpose of communication. For instance, if the user wants to use the transmission system just to have conversation, the user may not want to have high quality image data or sound data, while paying higher usage fees. In such case, the user at the terminal 10 may insert a recording medium to cause the terminal 10 to read a specific service ID for identifying a specific service (such as a service requiring less quality) from the recording medium. Alternatively, the terminal 10 may read out the service ID from its local memory. The terminal 10, which reads the service ID, sends the service ID to the management system 50 when requesting to start communication with a counterpart terminal 10. Even when the terminal 10 sends high-quality content data to the counterpart terminal 10, a relay device 30 that relays the content data, reduces down quality of content data. With this configuration, even when the usage fee of the transmission system becomes more expensive as the quality of image data and sound data becomes higher, that is, as the communication quality becomes higher, the user can use a communication quality that fits a particular communication application or purpose. Therefore, the user need not pay a wasteful usage fee.

The relay devices 30, the management system 50, the program providing system 90, and the maintenance system 100 in the above-described embodiment may be configured by a single computer or a plurality of computers to which divided portions (functions) are arbitrarily allocated. In addition, in the case where the program providing system 90 is configured by a single computer, a program transmitted by the program providing system 90 may be separately transmitted in units of a plurality of modules, or may be transmitted in its entirety. Further, in the case where the program providing system 90 is configured by a plurality of computers, a program may be divided into a plurality of modules, and the modules may be individually transmitted from the respective computers.

In addition, a recording medium such as a CD-ROM storing the terminal program, the relay device program, or the transmission management program in the above-described embodiment, the HD 204 storing these programs, and the program providing system 90 including the HD 204 are used as program products in the case of providing the terminal program, the relay device program, and the transmission management program to users within a certain country or outside that country.

Although the date/time received is managed in FIGS. 11, 13, and 15, the embodiment is not limited to this, and, out of the date/time received, it is only necessary to manage at least the time received.

Further, although the IP address of each relay device 30 is managed in FIG. 11 and the IP address of each terminal 10 is managed in FIG. 13 in the above-described embodiment, the embodiment is not limited to this case, and the fully qualified domain name (FQDN) of each relay device 30 or each terminal 10 may be managed instead as long as an FQDN serves as relay device identification information for identifying each relay device 30 on the communication network 2 or terminal identification information for identifying each terminal 10 on the communication network 2. In this case, an IP address corresponding to an FQDN is obtained by a Domain Name System (DNS) server of the related art. Note that, not only "relay device identification information for identifying each relay device 30 on the communication network 2", but also "relay device connection destination information indicating a connection destination of each relay device 30 on the communication network 2", or "relay device counterpart terminal information indicating a counterpart terminal of each relay device 30 on the communication network 2" may be used. Similarly, not only "terminal identification information for identifying each terminal 10 on the communication network 2", but also "terminal connection destination information indicating a connection destination of each terminal 10 on the communication network 2", or "terminal counterpart terminal information indicating a counterpart terminal of each terminal 10 on the communication network 2" may be used.

In addition, although the case of a videoconference terminal has been described as an example of a transmission terminal in the above-described embodiment, the embodiment is not limited to this case, and the communication system 1 may be a phone system such as an IP phone system or an Internet phone system. In addition, a smart phone, a mobile phone, a car navigation terminal, a wearable computer, a monitoring camera, an electronic blackboard, a projector, a game machine, or industrial equipment with a communication function may be used. A wearable computer includes a watch and a head-mounted display. Industrial equipment includes office equipment such as a multifunction peripheral (MFP) primer product, medical equipment such as an endoscope, and agricultural equipment such as a cultivator.

In addition, although image data and sound data are described as examples of content data in the above-described embodiment, the content data is not limited to these items of data, and the content data may be touch data. In this case, a feeling obtained by a user's contact at one terminal side is transmitted to the other terminal side. Further, the content data may be smell data. In this case, a smell at one terminal side is transmitted to the other terminal side. In addition, the content data may be at least one of image data, sound data, touch data, and smell data.

In addition, although the case in which a videoconference is held by the transmission system 1 has been described in the above-described embodiment, the embodiment is not limited to this case. The transmission system 1 may be used in meetings, general conversation between family members or friends, or one-way presentation of information.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted to each other within the scope of this disclosure and appended claims.

Further, any of above-described devices or units can, be implemented as a hardware apparatus, such as a special-purpose circuit or device, or as a hardware/software combination, such as a processor executing a software program.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM, and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a castle memory of the CPU, and the RAM may function as a physical memory or a primary memory of the apparatus, while the HDD may function, as a secondary memory of the apparatus.

The invention claimed is:
1. A transmission management system that manages a plurality of transmission devices, comprising:
 a memory that stores, for each of a plurality of services
  that can be provided to one or more of the transmission devices, service identification information for identifying the service, and service contents information defining quality of the service;
a receiver that receives, from a first transmission device, a request for starting communication with a second transmission device, the request including first service identification information for identifying a service to be provided to the first transmission device;
circuitry that obtains first service contents information associated with the first service identification information from the memory, the first service contents information defining quality of the service to be provided to the first transmission device; and
a transmitter that transmits the first service contents information to a relay device, so as to cause the relay device to transmit content data, according to the quality of the service defined by the first service contents information, between the first transmission device and the second transmission device through a session established in response to the request for starting communication.

2. The transmission management system of claim 1, wherein the relay device transmits the content data received from the first transmission device to the second transmission device according to the quality of the service defined by the first service contents information.

3. The transmission management system of claim 1, wherein the relay device transmits the content data received from the second transmission device to the first transmission device according to the quality of the service defined by the first service contents information.

4. The transmission management system of claim 1, wherein the quality of the service is defined by at least one of an image quality of image data and a sound quality of sound data.

5. The transmission management system of claim 4, wherein the image quality of the image data is defined by at least one of a frame rate, a bit rate, a resolution, and a color depth.

6. The transmission management system of claim 4, wherein the sound quality of the sound data is defined by at least one of a sampling rate, a bit rate, and a quantization bit rate.

7. The transmission management system of claim 1, wherein the first service contents information indicates an encoding format of the content data to be transmitted between the first transmission device and the second transmission device.

8. The transmission system of claim 1, further comprising:
the first transmission device that sends the request for starting communication with the second transmission device.

9. A transmission system, comprising:
the transmission management system of claim 1; and
the relay device that relays content data between two or more of the plurality of transmission devices, the relay device including:
a relay memory that stores the first service contents information transmitted from the transmission management system in association with the first service identification information; and
a relay transmitter that transmits the content data that matches the first service contents information between the first transmission device and the second transmission device.

10. The transmission system of claim 9, wherein the relay device includes:
a relay receiver that receives content data from one of the first transmission device and the second transmission device; and
relay device circuitry that determines whether the content data received from the one of the first transmission device and the second transmission device has a quality that matches the first service contents information, and changes the quality of the content data so as to match the first service contents information based on determination.

11. The transmission system of claim 10, wherein
the relay device circuitry changes the quality of the content data to be equal to or lower than the quality of content data defined by the first service contents information.

12. A transmission system, comprising:
the transmission management system of claim 1; and
the relay device that relays content data between two or more of the plurality of transmission devices, the relay device including:
relay device circuitry configured to
receive content data from one of the first transmission device and the second transmission device and receive the first service contents information from the transmission management system, the first service contents information defining quality of the service requested by the first transmission device,
determine whether the content data received from the one of the first transmission device and the second transmission device has a quality that matches the quality defined by the first service contents information,
change the quality of the content data so as to match the first service contents information based on the determination, and
transmit the content data having the quality that matches the first service contents information to the other one of the first transmission device and the second transmission device.

13. A method of controlling transmission of content data between a plurality of transmission devices, comprising:
storing in a memory, for each one of a plurality of services that can be provided to one or more of the transmission devices, service identification information for identifying the service, and service contents information defining quality of the service;
receiving, from a first transmission device, a request for starting communication with a second transmission device, the request including first service identification information for identifying a service to be provided to the first transmission device;
obtaining first service contents information associated with the first service identification from the memory, the first service contents information defining quality of the service to be provided to the first transmission device; and
transmitting the first service contents information to a relay device, so as to cause the relay device to transmit content data, according to the quality of the service defined by the first service contents information, between the first transmission device and the second transmission device through a session established in response to the request for starting communication.

14. The method of claim 13, wherein the relay device transmits the content data received from the first transmission device to the second transmission device according to the quality of the service defined by the first service contents information.

15. The method of claim 13, wherein the relay device transmits the content data received from the second transmission device to the first transmission device according to the quality of the service defined by the first service contents information.

16. The method of claim 13, further comprising:
determining whether the content data received from one of the first transmission device and the second transmission device has a quality that matches the first service contents information; and
changing the quality of the content data so as to match the first service contents information based on determination.

17. The method of claim 16, wherein the changing includes:
changing the quality of the content data to be equal to or lower than the quality of content data defined by the first service contents information.

18. The method of claim 13, further comprising:
receiving, in the relay device, content data from one of the first transmission device and the second transmission device and the first service contents information from a transmission management system, the first service contents information defining quality of the service requested by the first transmission device,
determining, in the relay device, whether the content data received from the one of the first transmission device and the second transmission device has a quality that matches the quality defined by the first service contents information,
changing, in the relay device, the quality of the content data so as to match the first service contents information based on the determination, and
transmitting, from the relay device, the content data having the quality that matches the first service contents information to the other one of the first transmission device and the second transmission device.

* * * * *